(12) United States Patent
Shigeta

(10) Patent No.: US 8,874,173 B2
(45) Date of Patent: Oct. 28, 2014

(54) MOBILE INFORMATION TERMINAL

(75) Inventor: Saya Shigeta, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1049 days.

(21) Appl. No.: 12/521,770

(22) PCT Filed: Dec. 28, 2007

(86) PCT No.: PCT/JP2007/075324
§ 371 (c)(1),
(2), (4) Date: Jul. 23, 2009

(87) PCT Pub. No.: WO2008/081946
PCT Pub. Date: Jul. 10, 2008

(65) Prior Publication Data
US 2010/0317406 A1    Dec. 16, 2010

(30) Foreign Application Priority Data

Dec. 28, 2006  (JP) ................. 2006-354041
Dec. 28, 2006  (JP) ................. 2006-354043
Dec. 28, 2006  (JP) ................. 2006-354044

(51) Int. Cl.
*H04B 1/38* (2006.01)
*H04M 1/00* (2006.01)
*G06F 3/12* (2006.01)
*H04M 1/725* (2006.01)

(52) U.S. Cl.
CPC ...... *H04M 1/72561* (2013.01); *H04M 1/72519* (2013.01)
USPC ................ 455/566; 455/550.1; 358/1.15

(58) Field of Classification Search
None
See application file for complete search history.

(56) References Cited

U.S. PATENT DOCUMENTS

| 6,671,508 | B1 * | 12/2003 | Mitsuoka et al. | 455/412.1 |
| 6,765,528 | B2 * | 7/2004 | Tranchina et al. | 342/357.31 |
| 7,440,749 | B2 * | 10/2008 | Muto | 455/414.1 |
| 2004/0070782 | A1 * | 4/2004 | Mihira | 358/1.14 |
| 2005/0223405 | A1 * | 10/2005 | Iizuka et al. | 725/52 |
| 2006/0025112 | A1 * | 2/2006 | Hamanaga et al. | 455/412.1 |

FOREIGN PATENT DOCUMENTS

| JP | 2002-304413 | 10/2002 |
| JP | 2003-162355 | 6/2003 |

OTHER PUBLICATIONS

Office Action for Japanese Patent Application No. 2006-354044, mailed May 15, 2012, 6 pages (including English translation).
International Search Report for PCT/JP2007/075324, mailed Mar. 25, 2008, 1 page.

* cited by examiner

*Primary Examiner* — Marcus T Riley
(74) *Attorney, Agent, or Firm* — Duane Morris LLP

(57) ABSTRACT

Provided is a mobile information terminal in which even a CPU having a low processing capability can realize a pseudo-multi task and understand the operation of an application program being started. The mobile information terminal includes: a display part (17), a storage part (13), a communication part (11), and a control part (12). Each time a document displayed on the display part (17) is updated, the control part (12) stores a display history of the document. When interrupting execution of the document display application, the control part (12) judges whether or not the acquisition destination information on the displayed document is stored in the storage part (13). If no, the acquisition destination information is stored in the storage part (13) separately from the display history the display part (17) controls to display the interrupted display information indicating that the document display by the document display application is interrupted. If yes, the acquisition destination information is not stored again in the storage part (13).

10 Claims, 19 Drawing Sheets

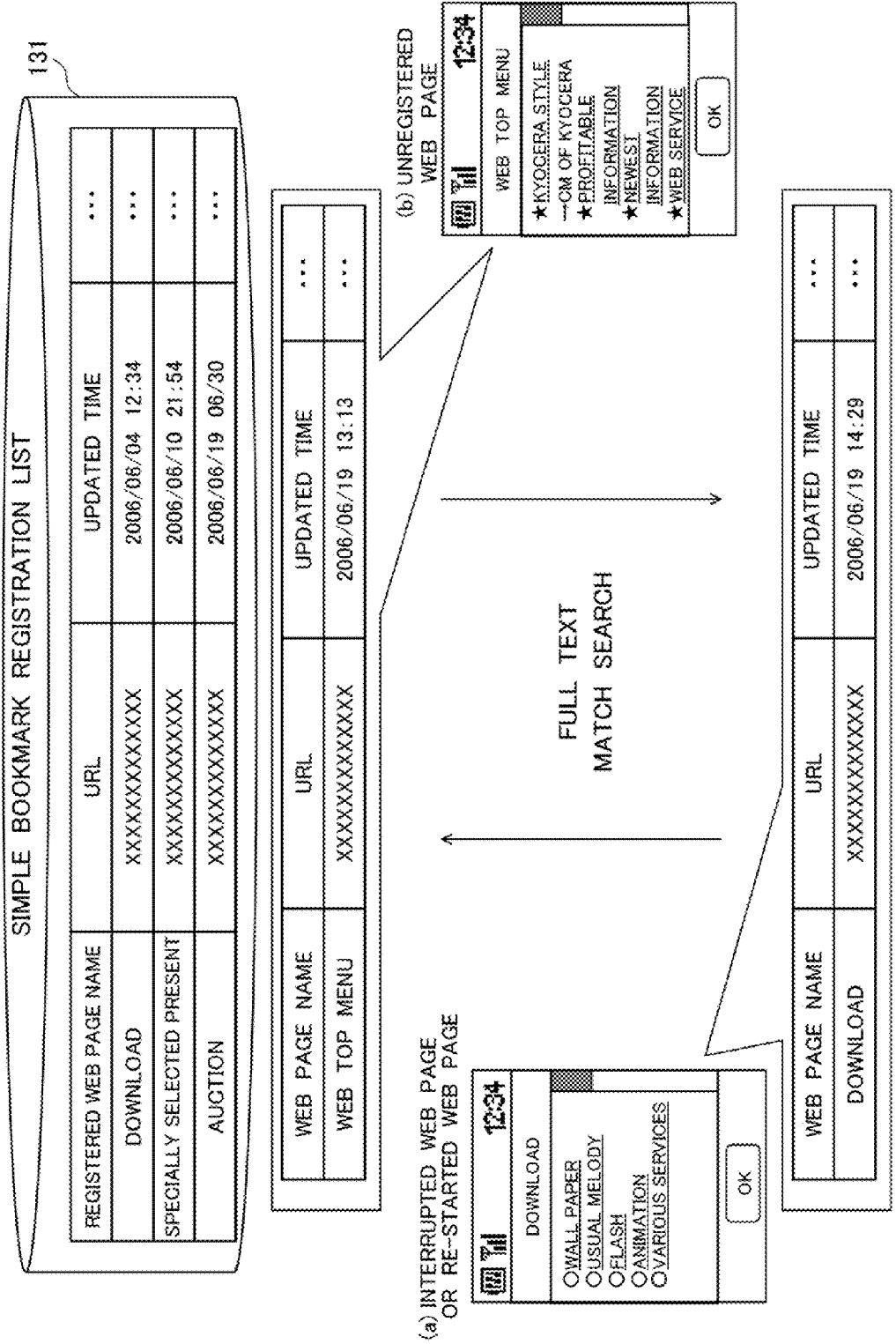

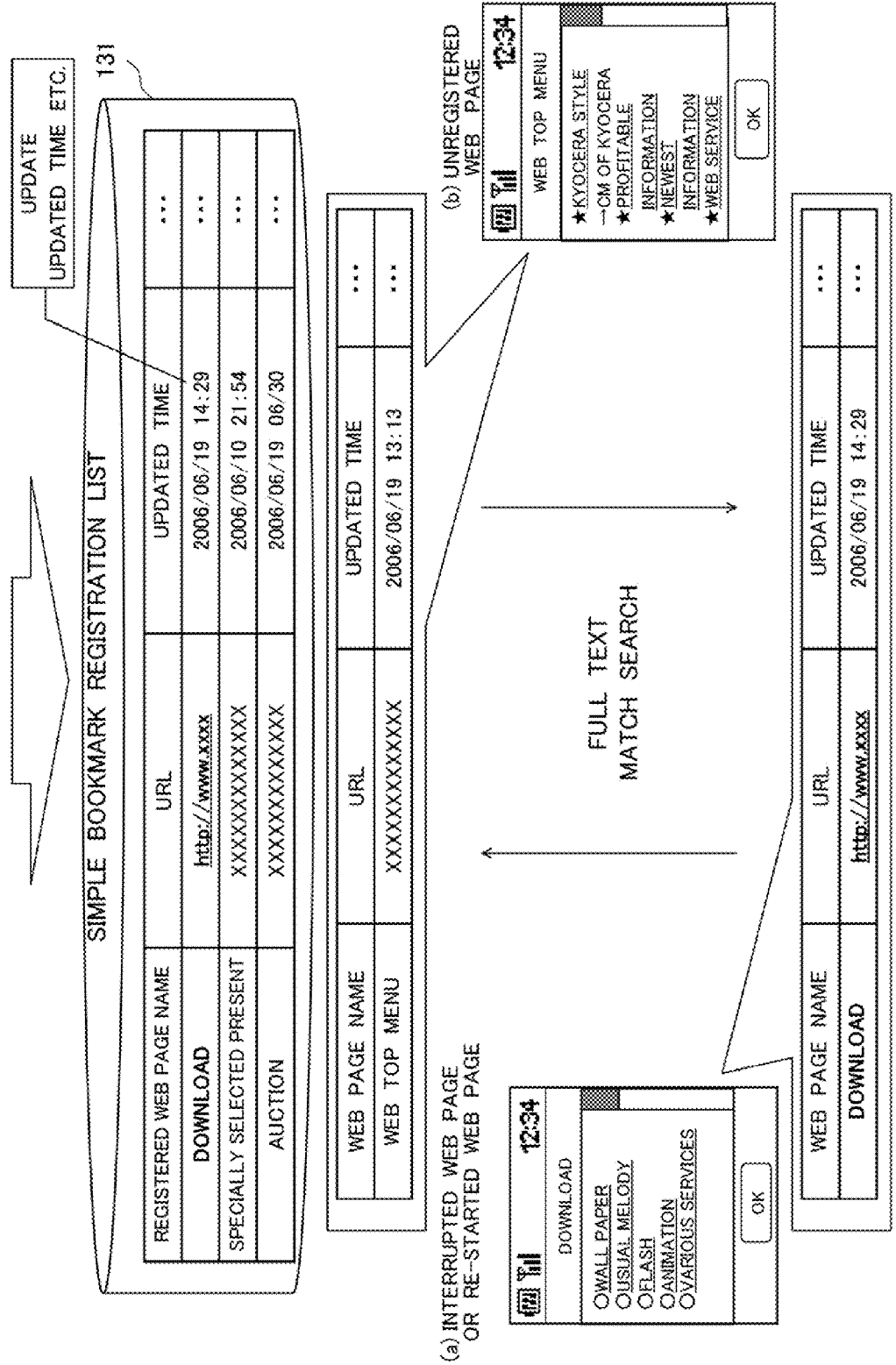

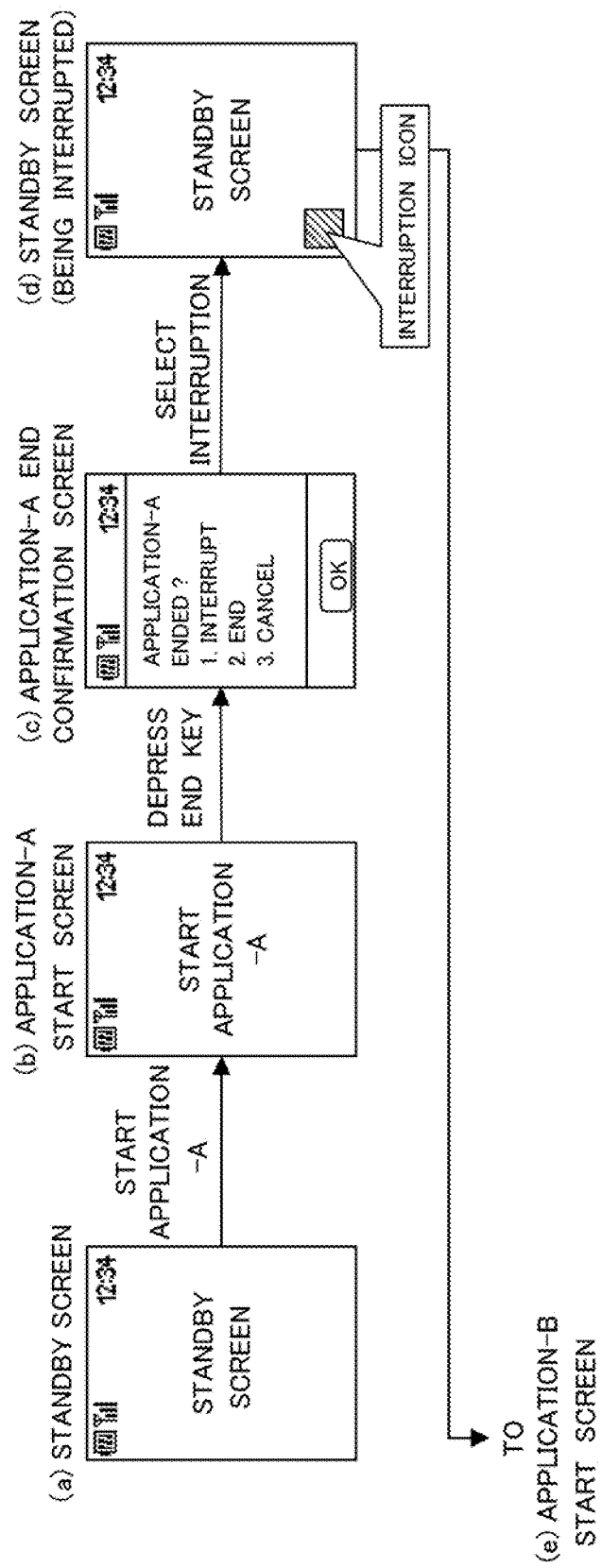
FIG. 5-A

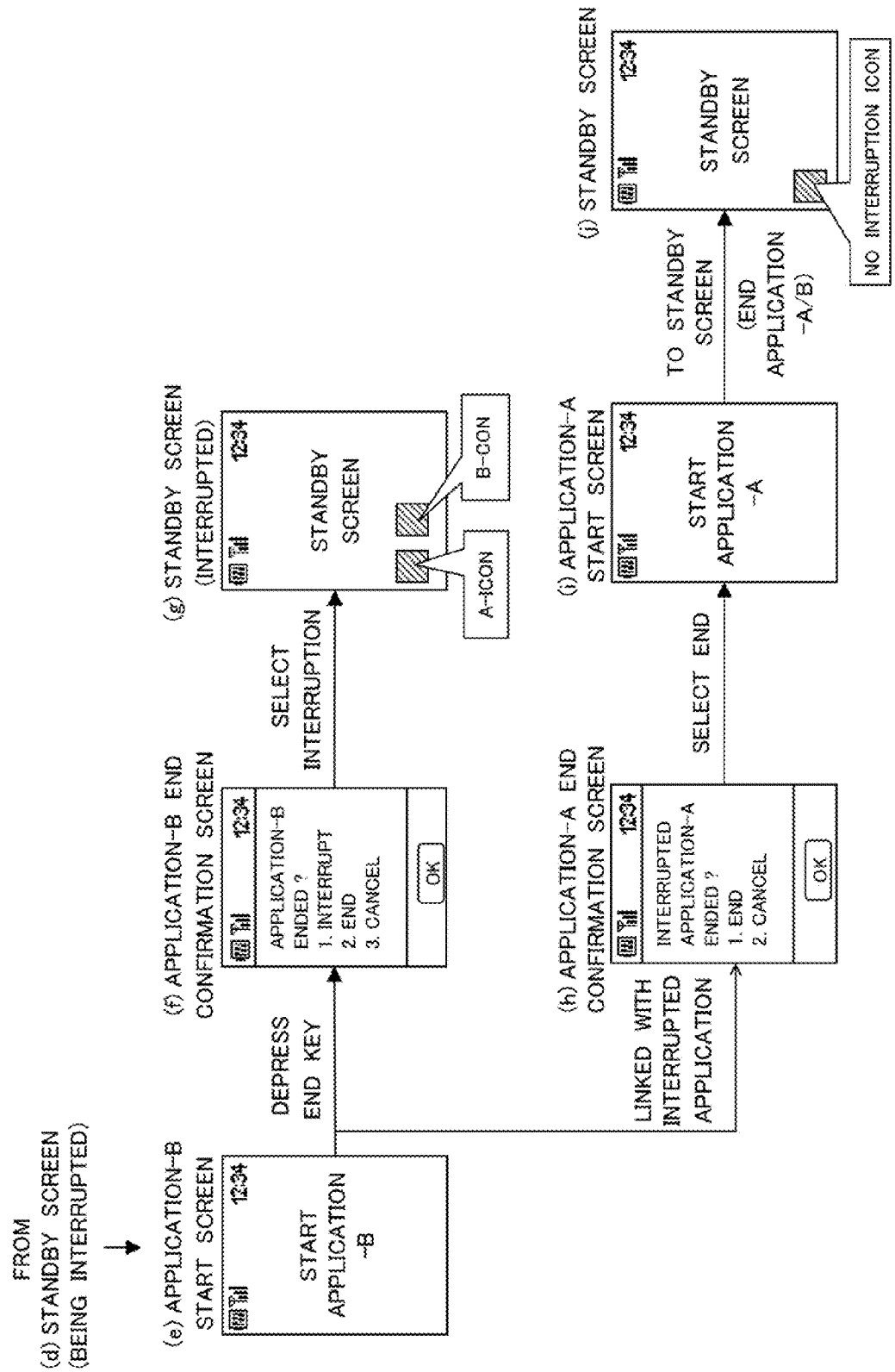
FIG. 5-B

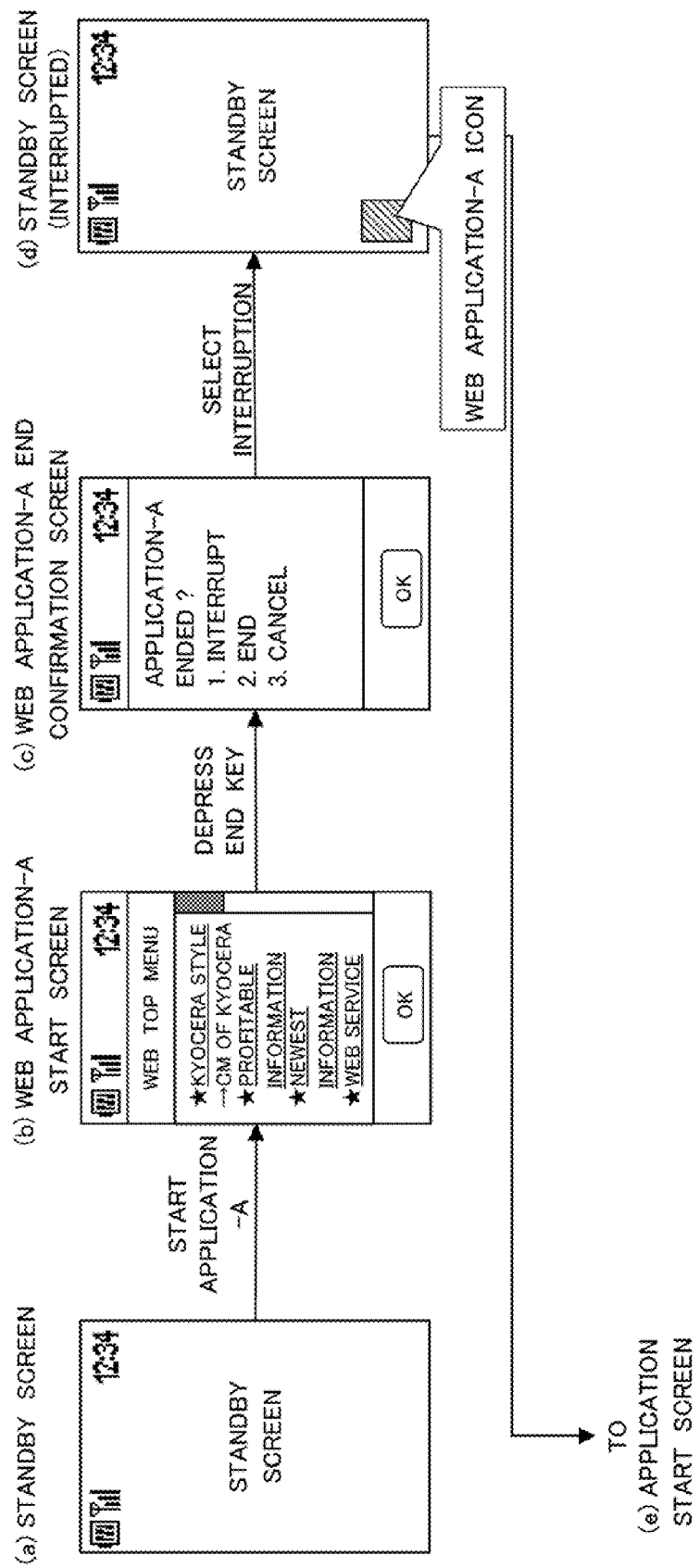
FIG. 6-A

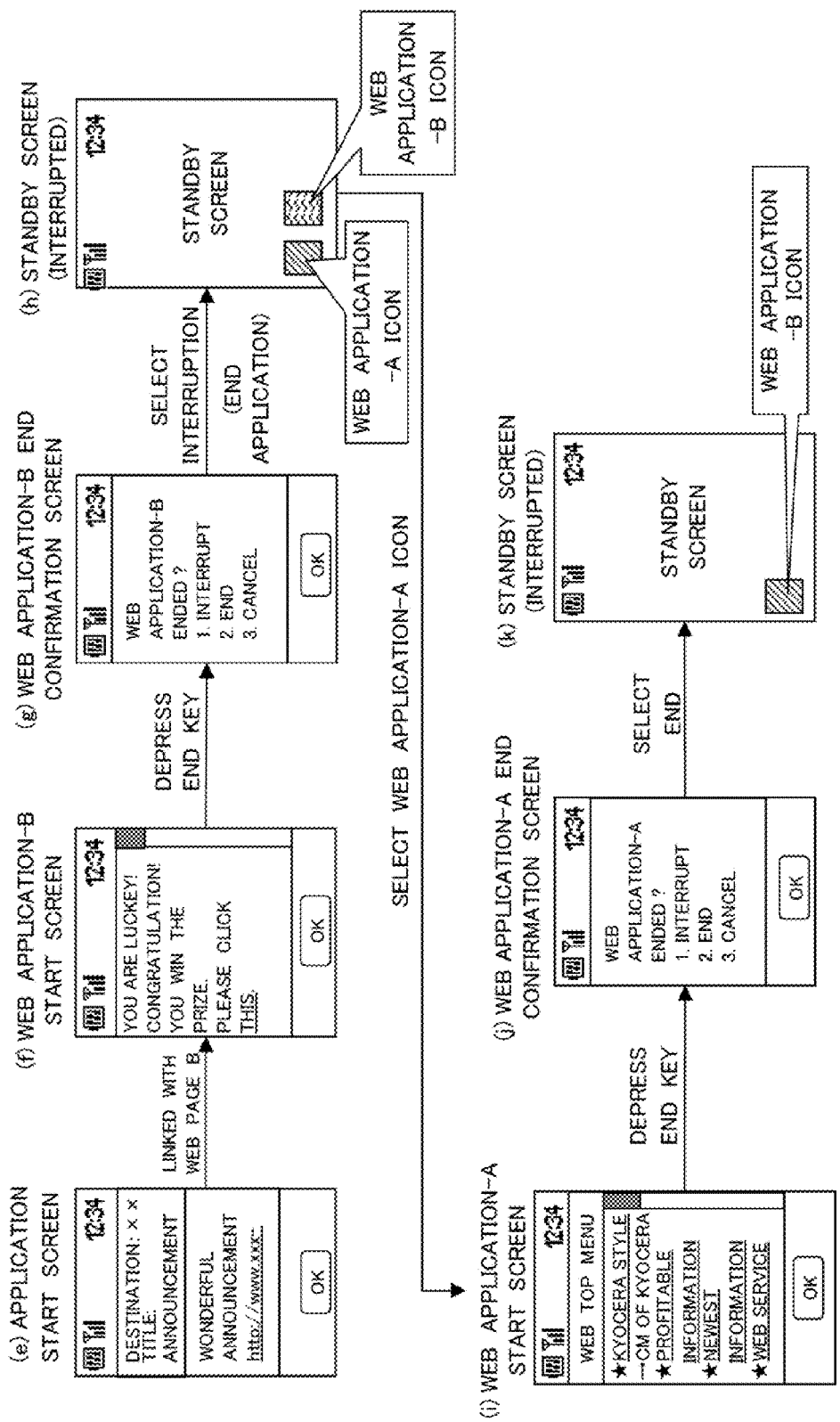
FIG. 6-B

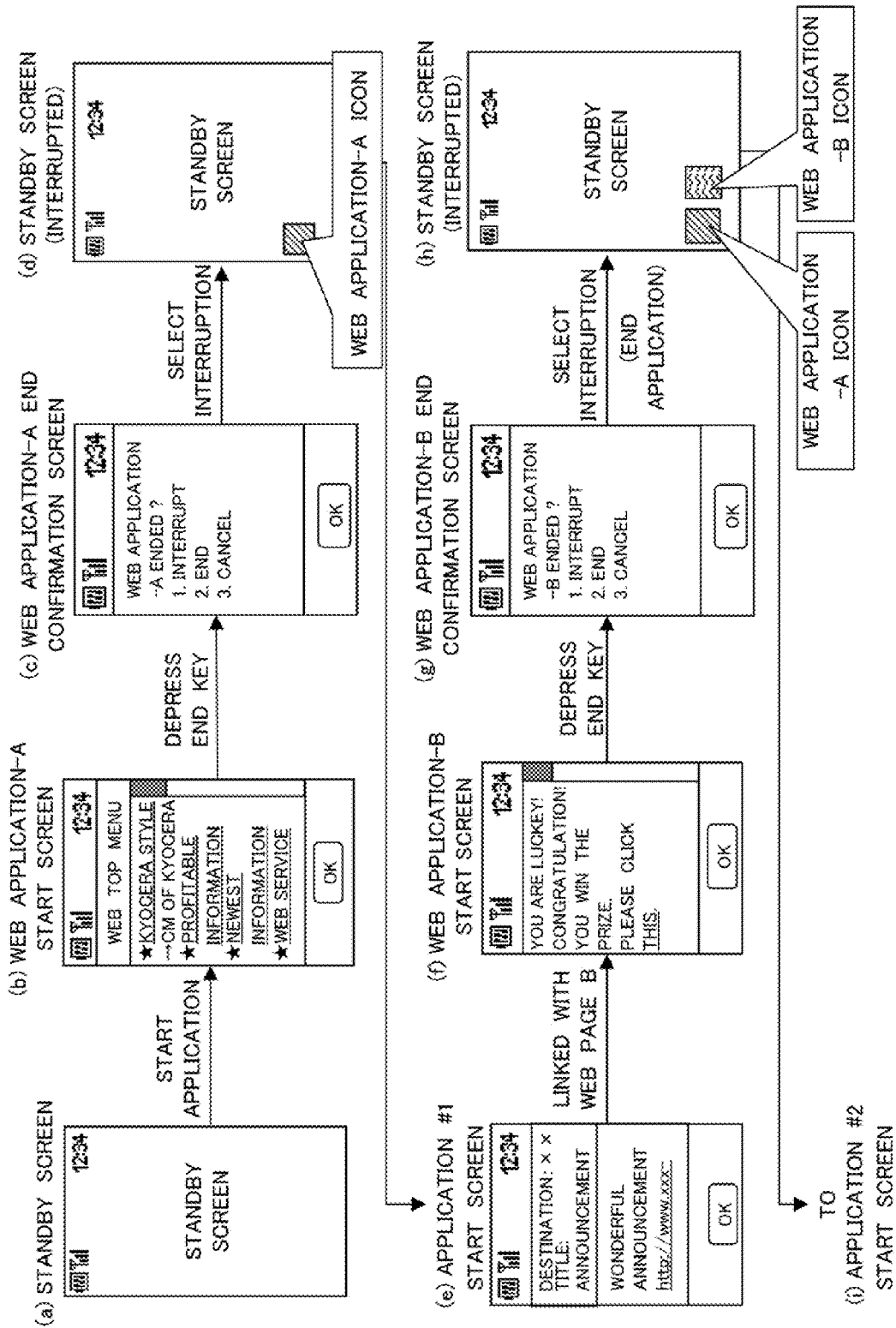

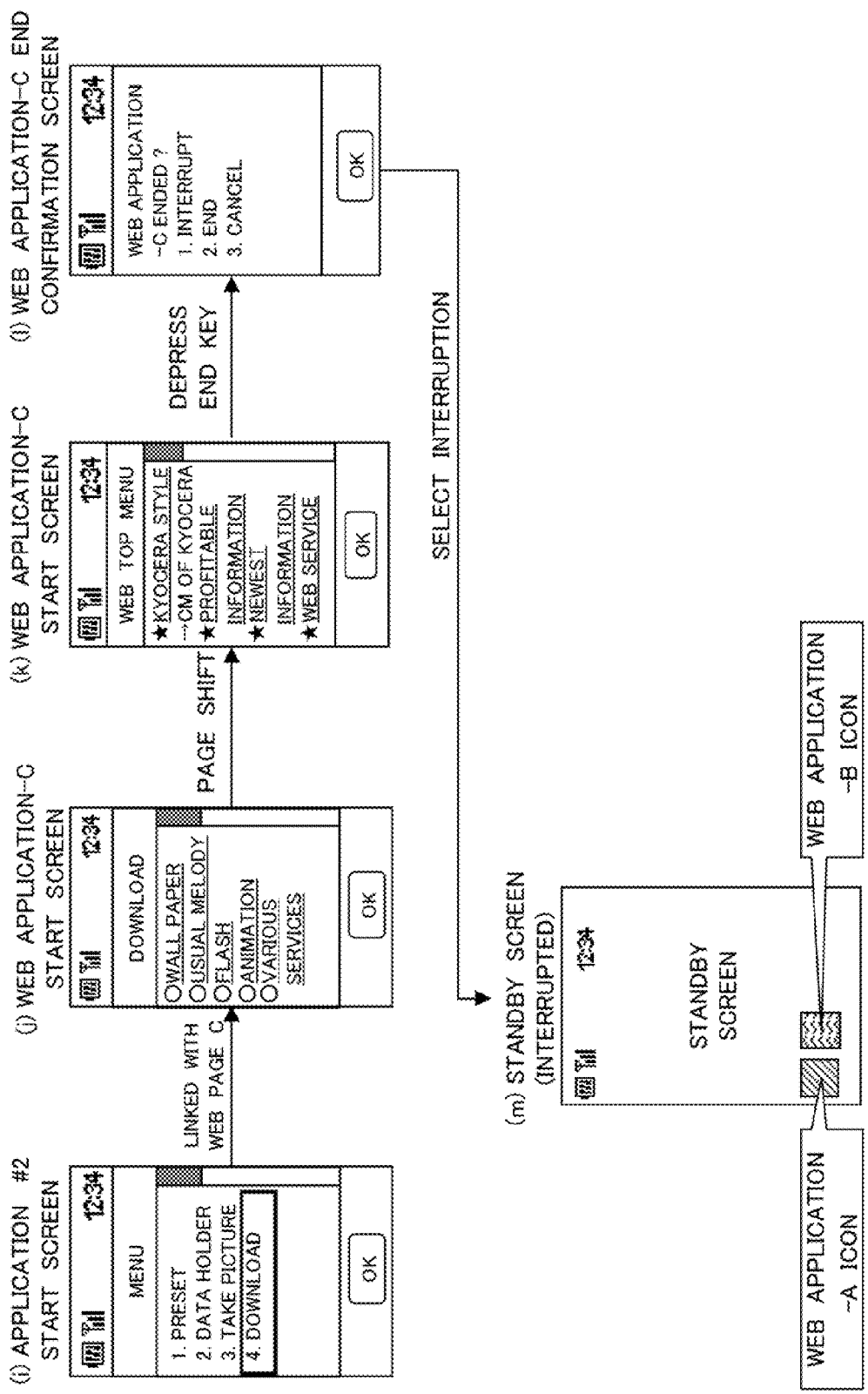

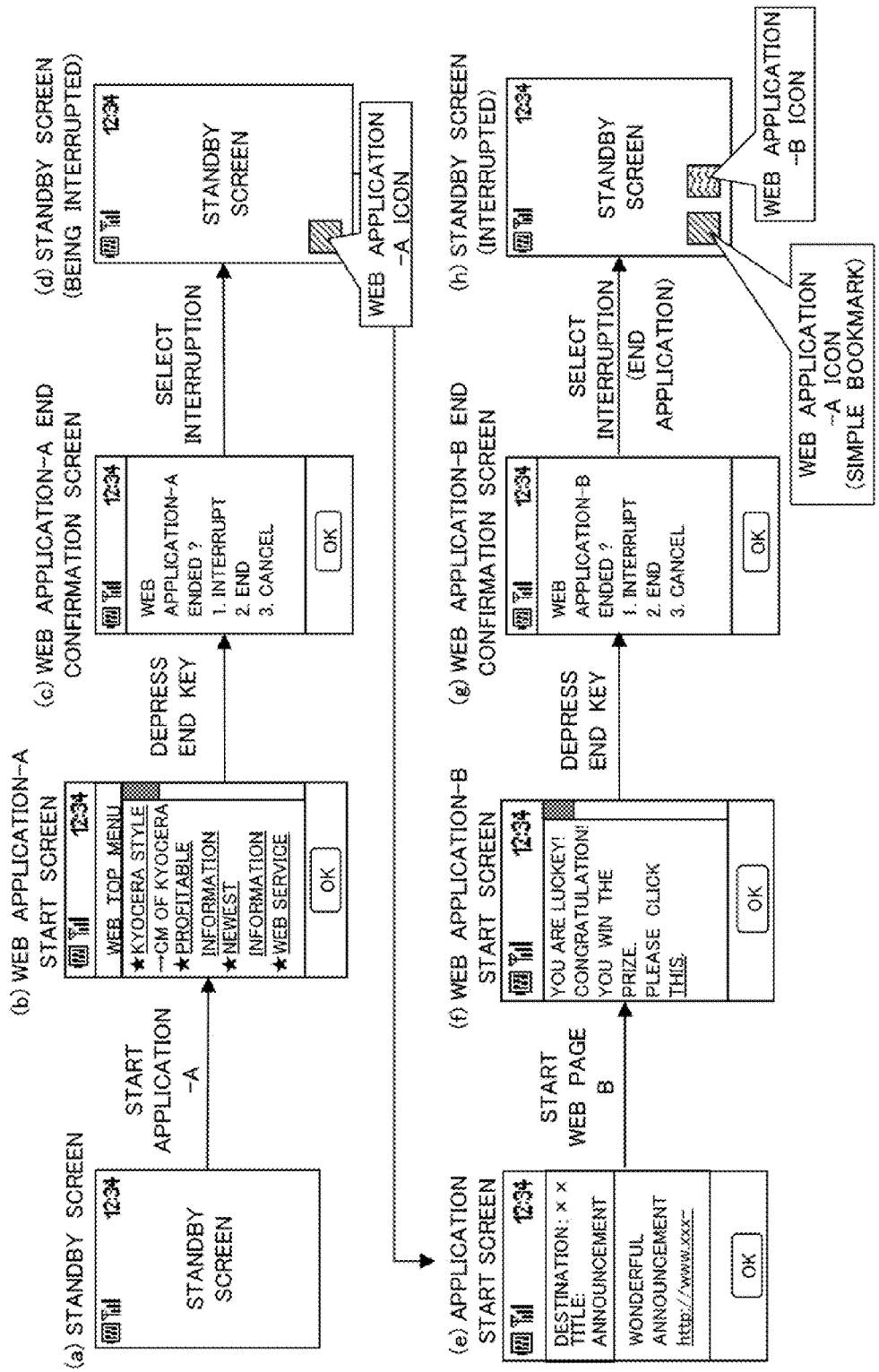
FIG. 14-A

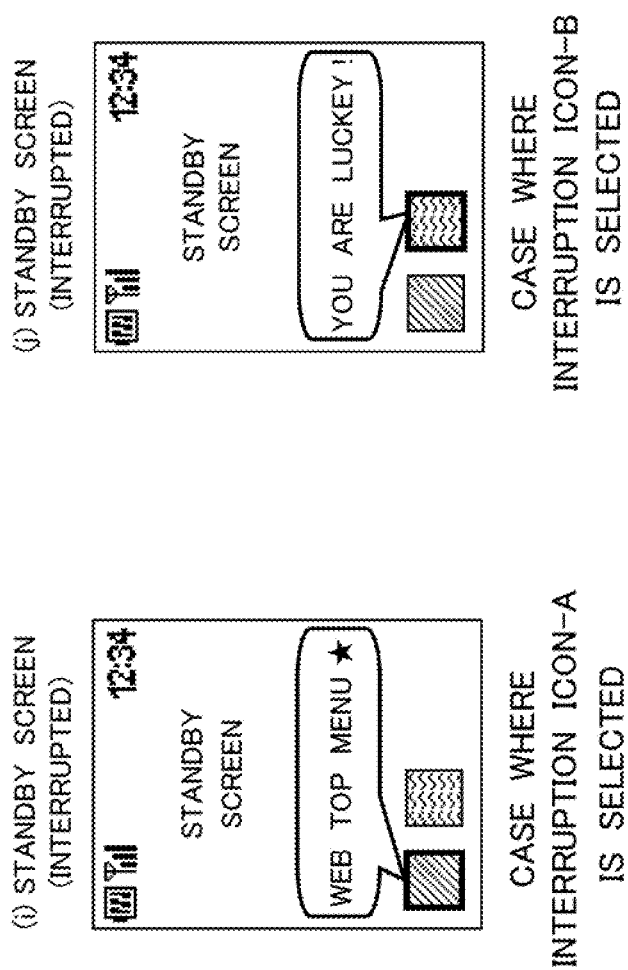
FIG. 14-B

MOBILE INFORMATION TERMINAL

CROSS REFERENCE TO RELATED APPLICATIONS

This application is a U.S. National Phase Application of International Patent Application No. PCT/JP2007/075324 filed Dec. 28, 2007 which claims priority to Japanese Patent Applications No. 2006-354041 filed Dec. 28, 2006, No. 2006-354043 filed Dec. 28, 2006, and No. 2006-354044 filed Dec. 28, 2006, the disclosures of which are incorporated herein in their entirety.

TECHNICAL FIELD

The present invention relates to a mobile information terminal equipped with a document viewing application program for viewing a document acquired by communication with a network.

BACKGROUND ART

A document display application program (for example, a web browser) for displaying a document acquired by communication with a computer network is a software for carrying out the download of an HTML (Hyper Text Mark-up Language) file, image file, music file, etc. from the Internet, analysis of their layout, display of them on a screen, and play them back.

In recent years, there have appeared third generation mobile information terminals simultaneously parallel processing a plurality of functions and adapted to multi-tasking, such as, enabling browsing by a browser while listening to music, and generating e-mails in the intervals.

Further, the technique, when starting up and simultaneously parallel processing a plurality of application software as described above, for facilitating switching of display to each application software, assigning an icon to each task or application program and displaying the icon provided corresponding to a task being started in order to show existence of that task, is being proposed as well (see, for example, Patent Document 1).

Patent Document 1: Japanese Patent Publication (A) No. 2003-162355

DISCLOSURE OF THE INVENTION

Problem to be Solved by the Invention

In order to deal with the above multi-tasking or, as in the art disclosed in Patent Document 1, to enable a perfect understanding of an application program operation being started up, it is necessary to mount a CPU having a high processing capability on the terminal. This is disadvantageous in view of costs.

On the other hand, in a browser, there is known a simple bookmark registration function able to record an address of a website (URL: Uniform Resource Locator) visited many times and designate the address of the website by a simple operation. This function is a function resembling a "bookmark" of a book, in a browser, it is sometimes called as a "hot list" or "favorites", and is a useful function since the operation of tracing input URL links can be eliminated.

The present invention is to provide a mobile information terminal capable of enabling a understanding of the operation of an application program being started.

Means for Solving the Problem

A first aspect of a terminal of the present invention is provided with a display part for displaying a document, a storage part for storing information, a communication part which can be connected to a network, and a control part for controlling execution of application programs including a document display application program for displaying a document acquired by the communication part. When interrupting execution of the document display application program, the control part judges whether or not acquisition destination information concerning the document being displayed is stored in the storage part, and makes the storage part store the acquisition destination information when the information is not stored, and prevents the storage part a new storing of the acquisition destination information again when the information is stored in the storage part.

Preferably, the control part stores a display history of a document in the storage part, each time a document to be displayed on the display part is updated, and makes the storage part store the acquisition destination information separately from the document display history when the acquisition destination information is not stored in the storage part.

Preferably, the control part updates an update time of the document display stored together with the acquisition destination information in the storage part when the acquisition destination information has been already stored in the storage part.

Preferably, the control part makes the display part display interrupted display information showing that the display of the document by the document display application program is being interrupted, when the document display application program is interrupted.

Preferably, the control part, when making the display part display a standby screen, makes the display part display the interrupted display information together, while makes the display part display the information in an order based on corresponding updating times when there are a plurality of interrupted display information to be displayed.

Preferably, the control part makes the communication part acquire the document based on the acquisition destination information corresponding to the selected interrupted display information so as to re-display the document according to the document display application program, when the interrupted display information displayed on the display part is selected.

Preferably, the control part stores the document display history in the storage part each time the document to be displayed on the display part is updated, and re-displays the document according to the document display application program based on the document display history when there is no acquisition destination information corresponding to the selected interrupted display information.

Preferably, the control part makes the storage part store the acquisition destination information concerning a first document being displayed when another application program starts during execution of the document display application program, and, when the acquisition destination information of a second document is linked with a portion of the information handled by the other application program and linked acquisition of the second document is instructed, the control part interrupts the other application program, and the control part judges whether or not the acquisition destination information of the second document is stored in the storage part.

A second aspect of the terminal of the present invention is provided with a display part for displaying a document, a storage part for storing information, a communication part which can be connected to a network, and a control part controlling execution of application programs including a document display application program for displaying a document acquired by the communication part. When interrupting execution of the document display application program, the control part stores the acquisition destination information concerning the document being displayed in the storage part, makes the display part display interrupted display information showing that the display of the document according to the document display application program being interrupted is being interrupted, and acquires the document again by the communication part based on the acquisition destination information and makes the display part display the information when the interrupted display information is selected and re-start is instructed.

Preferably, when interrupting the document display application program and making the display part display a new document, the control part controls to make the storage part store the acquisition destination information concerning the document which had been previously displayed, to end the document display application program, then to start the document display application program again so as to display the new document.

A third aspect of the terminal of the present invention is provided with a display part for displaying a document, a storage part for storing information, a communication part which can be connected to a network, and a control part controlling execution of application programs including a document display application program for displaying a document acquired by the communication part. When the document display application program is interrupted in a state where a first document is displayed and display of a second document by the document display application program is requested during execution of another application program, the control part controls to store acquisition destination information of the first document in the storage part, then to display the second document by the document display application program.

Preferably, when displaying a standby screen after ending display of the second document, the control part makes the display part display interrupted display information showing that display of the document by the document display application program is being interrupted for each of the first document and the second document.

Preferably, the acquisition destination information of the second document is linked with a portion of information handled by the other application program, and when linkage acquisition of the second document is instructed during execution of the other application program, the control part controls to interrupt the other application program and to start the document display application program.

Preferably, when selecting the interrupted display information, instructing re-start, and executing the document display application program to display the document again, the control part makes the communication part acquire the document based on the acquisition destination information corresponding to the selected interrupted display information.

A fourth aspect of the terminal of the present invention is provided with a display part for displaying a document, a storage part for storing information, a communication part which can be connected to a network, and a control part controlling execution of application programs including a document display application program for displaying a document acquired by the communication part. When an event occurs requiring the new start of the document display application program during interruption of the document display application program, the control part makes the storage part store the acquisition destination information of the document which had been displayed by the interrupted document display application program, then starts the document display application program based on the event and, when an event occurs not requiring the new start of the document display application program during interruption of the document display application program, the control part starts the document display application program based on the event while holding a document display history which had been displayed by the document display application program which had been executed in the storage part.

Preferably, the control part displays the interrupted display information showing that there is an interrupted document display application program, when making the display part display the standby screen in a state where the document display application program is interrupted.

Preferably, when re-start is instructed based on the interrupted display information, the control part acquires the document by the communication part by using the acquisition destination information and displays the information on the display part in the case where the interrupted document for which re-start is instructed is one having the acquisition destination information, and displays the document on the display part based on the display history stored in the storage part each time the display of the document to be displayed on the display part is updated in the case where the interrupted document for which re-start is instructed is not one having the acquisition destination information.

Preferably, the control part extracts information concerning the document corresponding to the interrupted display information based on the acquisition destination information or the display history when displaying the interrupted display information on the display part.

Effects of the Invention

According to the present invention, a mobile information terminal understandable the operation of an application program being started, can be provided.

BRIEF DESCRIPTION OF THE DRAWINGS

FIGS. 2A and 2B are conceptual diagrams of the operation exemplified for explaining the operation of a mobile information terminal according to an embodiment of the present invention.

FIGS. 5A and 5B are screen transition diagrams exemplified for explaining the specifications of a function switching UI of a mobile phone.

FIGS. 6A and 6B are screen transition diagrams exemplified for explaining specifications of an improved function switching UI of a mobile phone.

FIGS. 8A and 8B are screen transition diagrams exemplified for explaining the specifications of a further improved function switching UI of a mobile phone.

FIGS. 14A and 14B are is a screen transition diagram exemplified for explaining the specifications of the function switching UI of the mobile information terminal according to the third embodiment of the present invention.

EXPLANATION OF NOTATIONS

10 . . . mobile phone, 11 . . . communication part, 12 . . . control part, 13 . . . storage part, 14 . . . audio processing part, 15 . . . speaker (SP), 16 . . . microphone (MIC), 17 . . . display part, 18 . . . operation part, 120 . . . main control part, 121 . . . operation input acquisition part, 122 . . . application execution control part, 123 . . . drawing/display control part, 131 . . . simple bookmark registration list, 132 . . . cache region, and 133 . . . system save region.

BEST MODE FOR CARRYING OUT THE INVENTION

Below, the configuration and the operation of a mobile (portable) information terminal according to embodiments of the present invention will be explained. Below, the specifications (details) of a function switching UI (User Interface) of a mobile phone illustrated as a mobile information terminal will be explained.

Figure 1:
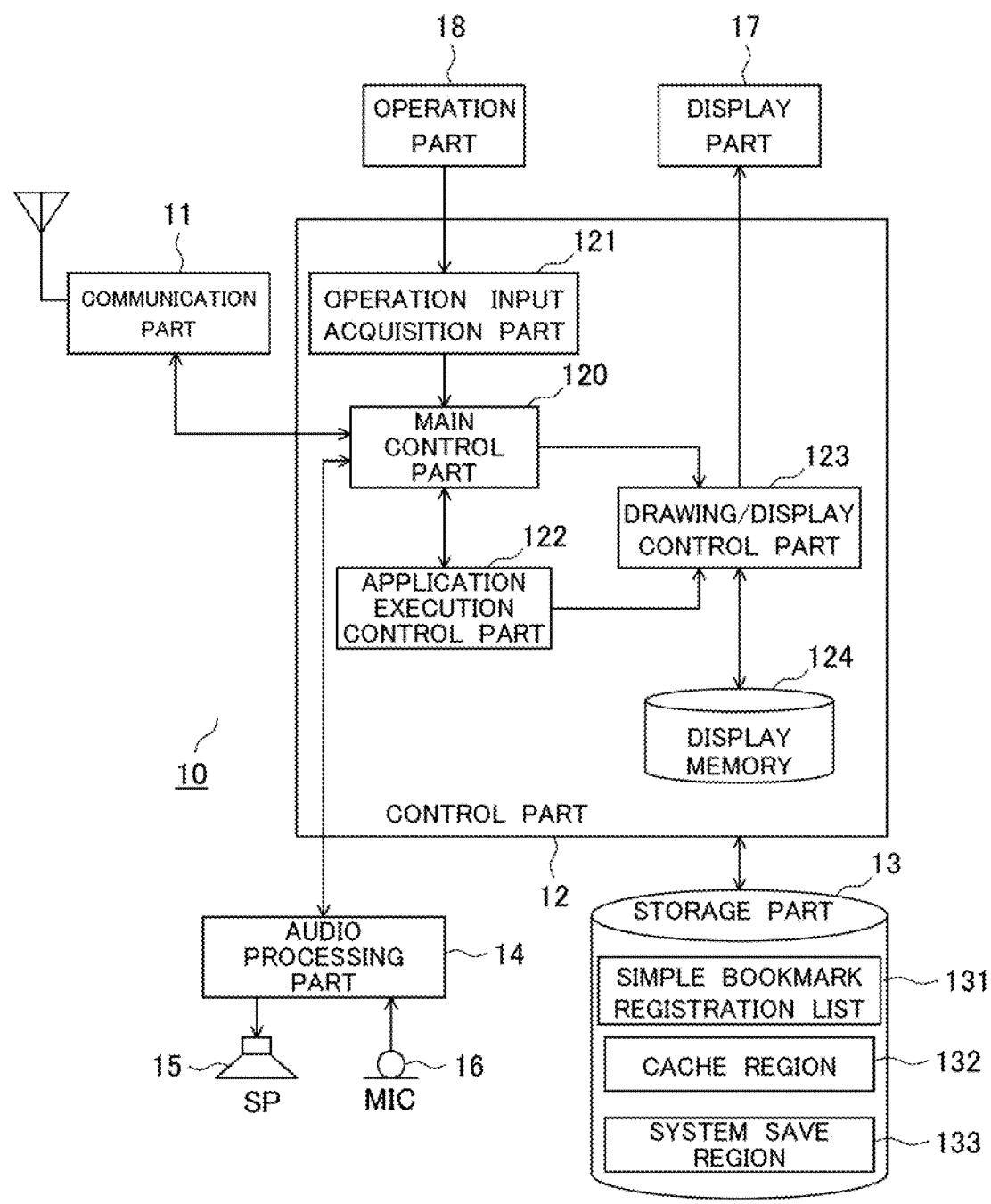
FIG. 1 is a block diagram showing the configuration of an internal portion of a mobile information terminal according to an embodiment of the present invention.

FIG. 1 is a block diagram showing the configuration of an internal portion of a mobile information terminal according to an embodiment of the present invention. Here, a mobile phone 10 is exemplified as the mobile information terminal.

As shown in FIG. 1, the mobile phone 10 is configured by providing with a communication part 11, control part 12, storage part 13, audio processing part 14, speaker 15 (SP), microphone 16 (MIC), display part 17, and operation part 18.

The communication part 11 carries out the transmission and reception wireless signals, through a channel assigned by either of not shown base stations with this base station. For example, the communication part connects to an external computer network (Internet communication network), acquires a web page by communication, and transfers the web page to the control part 12.

The control part 12, as shown in a functional development configuration of its internal configuration, configured by providing with a main control part 120, operation input acquisition part 121, application execution control part 122, drawing/display control part 123, and display memory 124, and performs processing concerning various types of functions in the mobile phone 10.

That is, in the control part 12, the operation input acquisition part 121 upon acquired input data including instructions of execution, interruption, and end of an application which is generated due to the operating of the operation part 18 by the user, the operation input acquisition part 121 transfers the input data to the main control part 120. Then, the main control part 120, when judged that the input data output from the operation input acquisition part 121 is data concerning an instruction (a command) of execution of an application, outputs an instruction signal of execution of the corresponding application to the application execution control part 122. Upon received the instruction signal of execution of the application from the main control part 120, the application execution control part 122 reads out the corresponding application stored in the storage part 13, and executes the application.

Note that, the respective functions held in the blocks 120 to 124 described above are achieved by the exection of programs stored in the storage part 13 in the control part 12, do not indicate only the blocks substantially differentiated from other blocks and built-in the control part 12, and are separately expressed the processing parts just for simplification of the explanation. Also note, the display memory 124 is shown as independently existing in the control part 12 here, but may be assigned to a partial region of the storage part 13 as well.

The storage part 13 stores various types of data utilized for processing executed by the control part 12. For example, the storage part holds programs (plurality of applications including a browser) executed by the control part 12, an address book for managing personal information such as phone numbers and e-mail addresses of other parties in communication, an audio file for playing back an incoming call sound or an alarm sound, an image file for the standby screen, various types of setting data, temporary data utilized in the processing process of the programs, and so on. This storage part 13 is configured by, for example, a nonvolatile memory device (nonvolatile semiconductor memory, hard disc device, optical disc device, etc.), a random accessible memory device (for example, SRAM or DRAM), or the like.

As parts in the storage part 13 particularly concerned with the present invention, the storage part 13 is assigned the simple bookmark registration list 131, cache region 132, and system save region 133 and stores various data etc. in each.

The audio processing part 14 performs processing on an audio signal output from the speaker 15 or an audio signal input at the microphone 16.

Namely, the audio processing part 14 amplifies the audio input from the microphone 16, performs analog-to-digital conversion to the amplified audio, further applies encoding or other signal processing to the same to convert it to digital audio data, and outputs the result to the control part 12.

Further, the audio processing part 14 applies decoding, digital-to-analog conversion, amplification, or other signal processing to the audio data supplied from the control part 12 to convert the same to an analog audio signal, and outputs the result to the speaker 15.

The display part 17 is configured by using, for example, a liquid crystal display panel, an organic EL (electro-luminescence) panel, or other display device and displays an image (FIGS. 1 to 4 or the like) in response to a video signal supplied from the control part 12.

The display part 17 displays, for example, a phone number of a destination at the time of a send (call) operation, a phone number of the called phone at the time of reception, contents of received mail and transmitted mail, the date, time, remaining battery power, success/failure of a send operation, a standby screen, and other various information and images.

Further, the operation part 18 has, for example, a power key, speak key, number keys, letter keys, direction keys, a decision key, a send key, and other keys to which various functions are assigned. When these keys are operated by the user, the operation part 18 generates signals corresponding to those operation contents and inputs these signals as an instruction of the user to the control part 12. Here, the operation part is used as an inputting means for a tab selection displayed on the standby screen.

The control part 12, when making the display part 17 display a web page acquired by connection with an external computer network at the communication part 11, executes an application program (hereinafter, an application program will be simply referred to as an "application") for a web browser among the programs stored in the storage part 13, and makes the display part 17 display the web page acquired based on execution of this application.

The main control part 120 in the control part 12 stores the display history of the document in the storage part 13 each time the web page or other document to be displayed on the display part 17, is updated. Further, the main control part 120 controls to enable the display of the interruption display information which shows that display of a document according to the document display application is being interrupted, on the display part 17, when the execution of the document display application for displaying the web page on the display part 17 is interrupted. Further, the main control part 120 judges whether or not the acquisition destination information concerning the document being displayed is stored in the storage part 13, when the execution of the document display application is interrupted, makes the storage part 13 store the acquisition destination information separately from the display history when the information is not stored, and prevents the storage part 13 from newly storing the acquisition destination information when the information is stored. In this way, the main control part 120 functions as a control center for realizing the functions held in control part 12, and handles the sequence control of the respective blocks explained later.

Further, the application execution control part 122 in the control part 12 has a function for executing applications including a browser, performs re-display of an interrupted web page by using the simple bookmark registration list 131 assigned to the storage part 13 and content stored in the cache region 132, and manages statuses such as the start, execution, interruption, or end of an executed application by using the system save region 133. Further, the drawing/display control part 123 edits content generated by the application execution control part 122 and held in the storage part 13 for display, draws the edited content in the display memory 124, reads out the display content in synchronization with a display timing of the display part 17, and displays the result on the display part 17.

The simple bookmark registration list 131 of the storage part 13, as shown in FIG. 2 illustrating an example of its data structure, is configured by a web page name, URL, update time, and other information fields. Here, when there is an interrupted web application and when another application links to another web page, the URL of the web page which had been displayed by the interrupted web application is stored. Further, in the cache region 132, a copy of information concerning the drawing of the displayed web page is stored as the display history. In the system save region 133, each time execution of an application is interrupted, system information for the time of restoration including the input data of mail being prepared immediately before the interruption of the interrupted application and other data being processed and the type of the application is saved and stored for used for restoration. Note that, FIG. 2 is shown as a conceptual diagram of the operation for judging coincidence with the interrupted web page. Details will be explained later.

Figure 3:
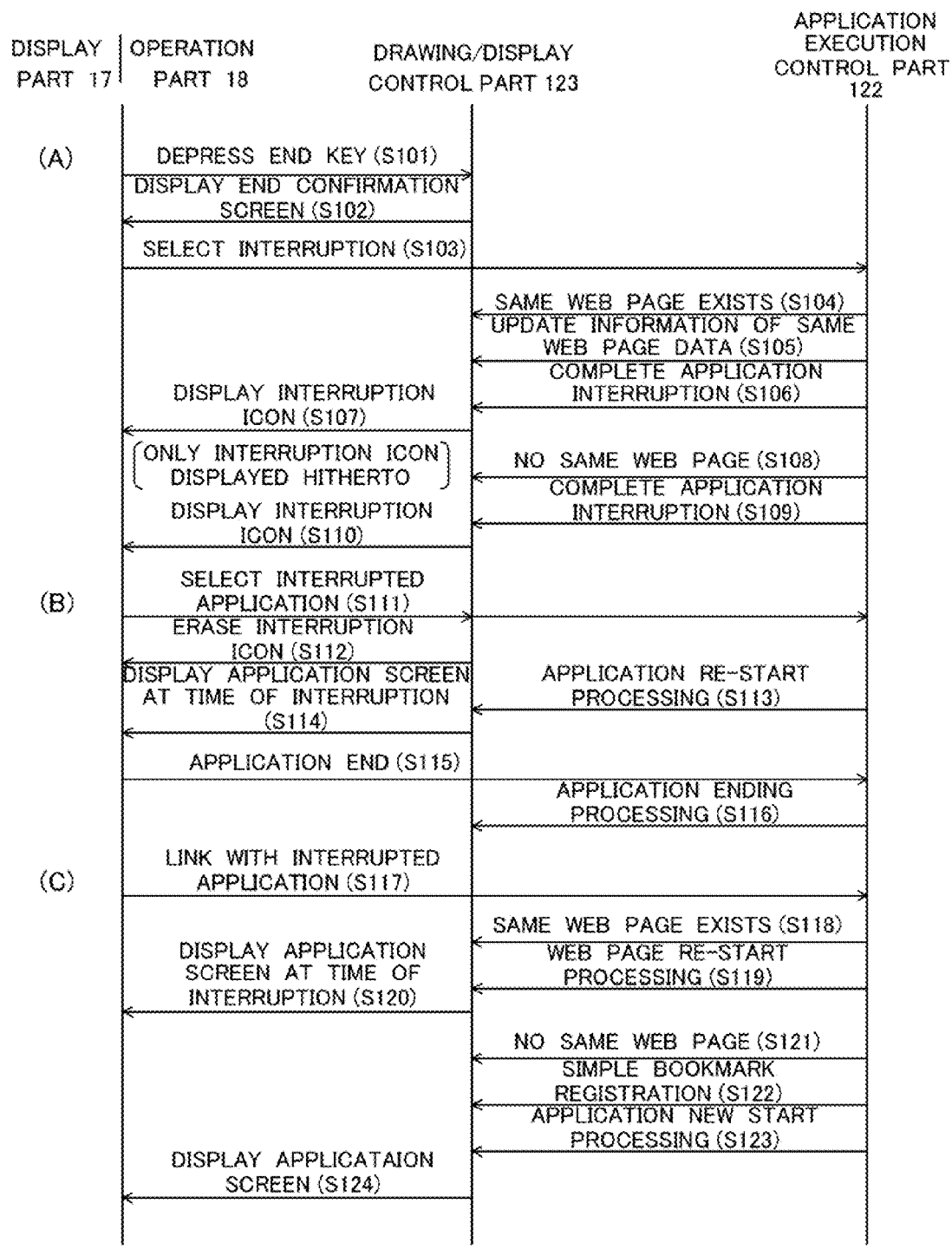
FIG. 3 is an operation sequence diagram exemplified for explaining the operation of a mobile information terminal according to an embodiment of the present invention.

FIG. 3 is an operation sequence diagram exemplified for explaining the operation of a mobile information terminal according to an embodiment of the present invention. Here, there are shown the followings: (a) the operation at the time of normal end of an application, (b) the operation at the time of normal re-start of an application, and (c) the registration operation of a simple bookmark at the time of linkage with the interrupted application among a user interface (display part 17 and operation part 18), the drawing/display control part 123, and the application execution control part 122.

In the operation sequence diagram in FIG. 3, an explanation will be given from the (a) operation sequence at the time of normal end of the application. Here, when a user operates the operation part 18 to depress an end key (S101) in a state where a certain application is started, the drawing/display control part 123 generates information displaying an end confirmation screen, draws it in the display memory 124, and displays the end confirmation screen on the display part 17 (S102).

Here, when the user confirming the display content selects interruption of the application through the end confirmation screen (S103), the application execution control part 122 executes processing for completion of interruption of the application. First, it is judged whether or not there is an interrupted application which is interrupted at the same web page or other document and, when there is an interrupted application which is interrupted in the same document (web page) (S104), updated information of the document (web page) in that interrupted application (S105), and completed the interruption processing of the application (S106). Then, the drawing/display control part 123 receiving a notification of the end of the interruption completion processing from the application execution control part 122 generates an interruption icon showing existence of the interrupted application, draws it in the display memory 124, and displays that interruption icon on the display part 17 (S107). Note that, the only interruption icons displayed at this time are the interruption icons which had been displayed up to then.

On the other hand, when there is no interrupted application being interrupted at the same document (web page) (S108), the interruption processing of the application is completed, as it is (S109). Namely, the content input immediately before the interruption, the system state etc. at that time, and other information required for restoration of the system are saved in the system save region 133 of the storage part 13 to wait for the time of re-start. Then, the drawing/display control part 123 receiving the notification of the end of the interruption completion processing from the application execution control part 122 generates an interruption icon showing existence of the interrupted application, draws the generated icon in the display memory 124, and displays that interruption icon on the display part 17 (S110). Note that, among the interruption icons displayed here, an interruption icon newly generated for the newly interrupted document display application is included in the interruption icons which had been displayed up to then.

Next, (b) the operation at the time of normal re-start of the application will be explained. When a user operates the operation part 18 to select an interruption icon displayed on the display part 17 and decide on that interrupted application (S111), the drawing/display control part 123 outputs a re-start instruction to the application execution control part 122 so as to restore the application corresponding to the selected interruption icon from the interruption, then erases that interruption icon (S112). The application execution control part 122 acquires the interruption information of the corresponding interrupted application from the storage part 13 and executes the application re-start processing (S113) in order to restore the application corresponding to the interrupted application from the interruption when accepting the re-start instruction signal from the drawing/display control part 123 and notifies this fact to the drawing/display control part 123. The drawing/display control part 123 makes the display part 17 display an application screen at the time of the interruption of the re-started interrupted application (S114). Then, when a user operates the operation part 18 to instruct an end of the application (S115), the application execution control part 122 executes the application end processing (S116), and the drawing/display control part 123 generates a standby screen information not accompanied with an interruption icon and displays that information on the display part 17. Note that, at step S111, it is judged whether the simple bookmark is to be used as the interruption information in accordance with the designated interrupted application, and processing in accordance with each is executed.

Next, (c) the operation at the time of linkage with the interrupted application will be explained. Here, in a case of a state where a certain document display application is interrupted, the user operates the operation part 18 to newly start another application, then an application the same as the interrupted document display application is called up from the new application and executed (S117), the application execution control part 122 judges whether or not the document displayed by execution of the new application is the same as the document (web page) of the interrupted application and, if the display document of the new application is the same as the document of the interrupted application (S118), the control part 122 reads out the information saved in the system save region 133 of the storage part 13 and restores the system state etc. in order to execute the re-start processing of the interrupted application and thereby re-starts the application execution processing from the state immediately before the interruption (S119). The drawing/display control part 123 receiving the re-start processing notification of the interrupted application displays the application screen of the time of the interruption on the display part 17 (S120).

On the other hand, if the display document of the new application is not the same as the document of the interrupted application (S121), the application which was in the interrupted state is registered as a simple bookmark (S122) and is further ended one time. Further, the start processing of the new application is executed based on the content described at the linking application B and the control is shifted to the drawing/display control part 123 (S123). Due to this, the drawing/display control part 123 generates the application screen information, draws that information in the display memory 124, and displays the result on the display part 17 (S124).

Figure 4:
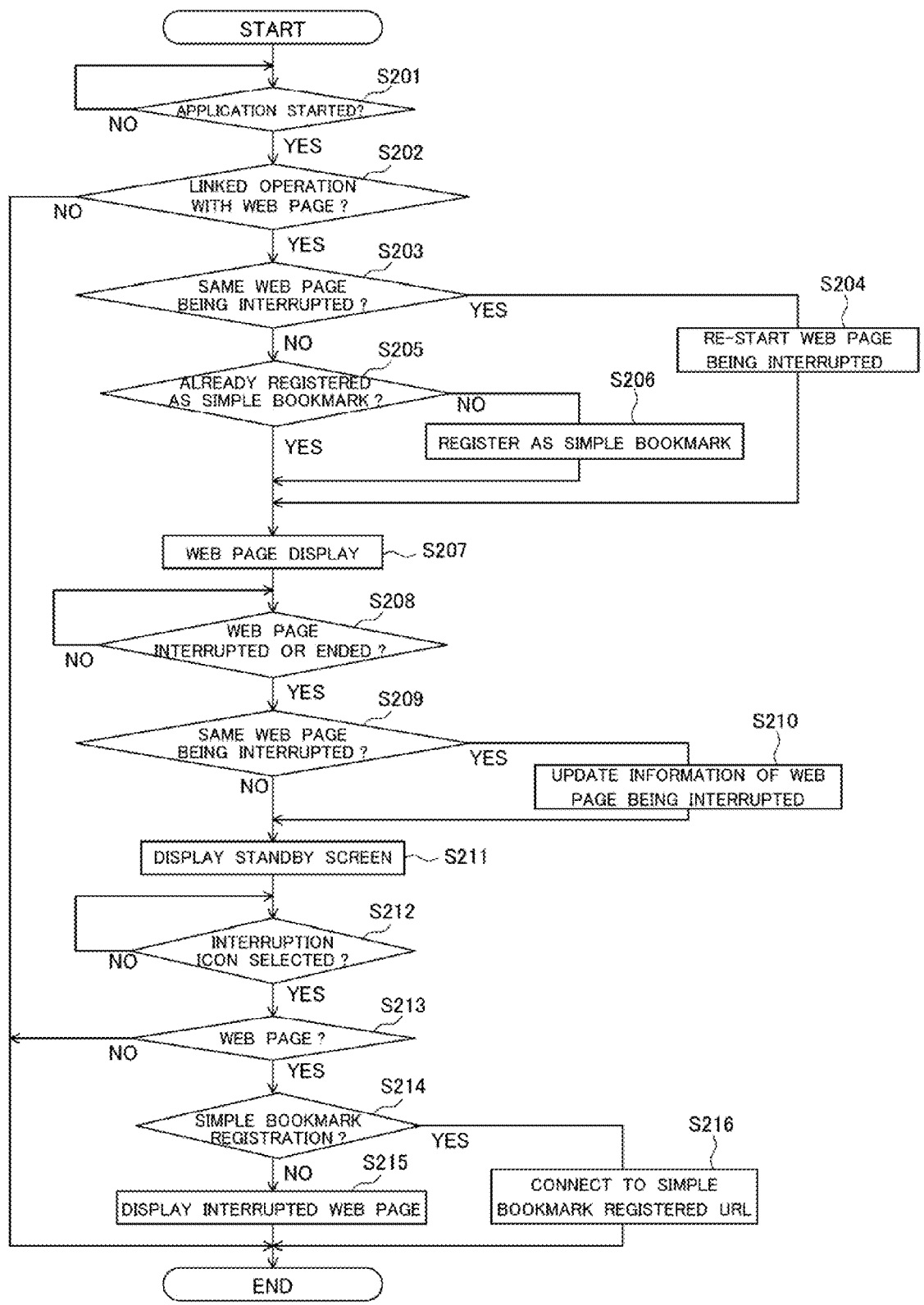
FIG. 4 is a flow chart exemplified for explaining the operation of a mobile information terminal according to an embodiment of the present invention.

FIG. 4 is a flow chart cited for explaining the operation of the mobile information terminal according to the embodiment of the present invention shown in FIG. 1 to FIG. 3 and shows the flow of the processing at the time of interruption of an application. Below, the operation of the mobile information terminal according to the embodiment of the present invention shown in FIG. 1 to FIG. 3 will be explained in detail with reference to the flow chart of FIG. 4.

First, assume that a user starts a certain application (here, a mailer) in a state where the execution of a web browser or other document display application is interrupted (S201 "Yes"). Assume here that the started application is linked with a web page (specifically, for example, the URL is linked with the opened mail). For example, when the user operates the operation part 18 and thereby a URL portion in the mail displayed on the display part 17 is selected (S202 "Yes"), the main control part 120 transfers to the main control part 120 the input data (application execution signal) acquired through the operation input acquisition part 121 or execution (start) of the document display application (web browser) corresponding to the selected URL portion.

The main control part 120 starts the application execution control part 122 based on the acquired input data, then the application execution control part 122 refers to the storage part 13 based on that URL, refers to the simple bookmark registration list 131 of the storage part 13, judges coincidence with the document (web page) of the interrupted document display application (web browser), and judges whether or not the web page set at the link is the web page displayed by the interrupted document display application stored in the cache region 132 (S203).

FIG. 2 shows a conceptual view of the operation for judging coincidence with a document (web page) of an interrupted document display application. As shown in FIG. 2, the simple bookmark registration list 131 is configured by a web page name, URL, update time, and other information fields. Namely, the application execution control part 122 judges coincidence by the URL and searches for a complete match between a document (web page) displayed by the interrupted document display application (web browser) or a document (web page) of a document display application re-started by the selection of the link (a) and a web page displayed by the interrupted document display application registered as a simple bookmark in the storage part 13 (b: simple bookmark registration list 131). Then, when coincidence is detected, interruption information for the simple bookmark registration is not newly registered (accordingly, no interruption icon is generated either): only the update time information existing in the updated time field of the corresponding URL in the simple bookmark registration list 131 is changed to a new one. This update time information is used to show when information was registered or when arranging in the youngest order the interruption icons displayed when displaying the standby screen at the display part. Note that, the judgment of coincidence shown in FIG. 2 was carried out conditional on a complete match, however, this may be substituted by a match of the front parts comparing a few digits at the start.

The explanation is returned to the processing in the flow chart of FIG. 4. In the judgment of coincidence with a document (web page) of an interrupted application described above (S203), when it is judged that a web browser displaying the same web page is interrupted and is stored in the cache region 132 (S203 "Yes"), the application execution control part 122 restores the system information which had been saved at the system save region 133 of the storage part 13 in order to re-start display of the web page by the interrupted application (S204), while the drawing/display control part 123 draws the content thereof in the display memory 124 and displays it at the display part 17 (S207).

On the other hand, when it is judged that the web page displayed by the web browser executed by selection of a link (URL) is not the same as the web page which had been displayed by the interrupted application stored in the cache region 132 (S203 "No"), the presence/absence of a web page displayed by an interrupted application which is not registered as a "favorite" in the simple bookmark registration list 131 is further judged (S205). Here, when it is judged that there is an unregistered web page displayed by an interrupted application which has been held at the cache (S205 "No"), that is, when there was a web browser which had been interrupted by using a cache before the web page which is now going to be opened, the application execution control part 122 registers the unregistered web page displayed by the interrupted application in the simple bookmark registration list 131 of the storage part 13 (S206) and starts the drawing/ display control part 123 to make the display part 17 display the web page of the web browser for which the start has been requested by linkage (S207). Note that, when it is judged that there is no unregistered web page displayed by an interrupted application (S205 "Yes"), the drawing/display control part 123 is started and the display part 17 is made to display the web page of the web browser for which the start has been requested by linkage by the drawing/display control part 123 (S207).

Then, when execution of the web browser displaying the web page of that link is interrupted again or ended (S208 "Yes"), the application execution control part 122 refers to the simple bookmark registration list 131 of the storage part 13, performs judgment of coincidence of the web page displayed by the interrupted application, and judges whether or not a web browser displaying the same web page as the web page being displayed by the web browser to be interrupted is being interrupted (S209).

Here, when it is judged that a web browser displaying the same web page is being interrupted (S209 "Yes"), the application execution control part 122 updates the information of the web page in that interrupted application (S210), and the drawing/display control part 123 generates an interruption icon showing existence of the interrupted application, draws the icon in the display memory 124, and displays the interruption icon on the standby screen (display part 17) (S211). Note that the only interruption icons displayed at this time are the interruption icon which had been displayed up to then. On the other hand, when it is judged that a web browser displaying the same web page is not being interrupted (S209 "No"), the interruption icon thereof is displayed on the standby screen (S211). Note that, in the interruption icons displayed at this time, not only interruption icons which had been displayed hitherto, but also an interruption icon which is newly generated for the newly interrupted web page is further included.

Then, the user selects one icon from among the plurality of interruption icons displayed on the standby screen of the display part 17 (S212 "Yes"). Here, as the applications displayed as interruption icons, other than a browser, for example, there are navigation, mailer, music player, and other applications. Further, a plurality of browsers are sometimes included. For this reason, when the cursor is moved to an interruption icon, the name of the interrupted application shown by this icon is displayed. Further, when the application is a web browser, text or the URL concerning the web page is displayed from the simple bookmark registration list 131 or cache region 132. This is to make it more convenient for the user at the time of selection.

That selected interruption icon shows the web page displayed by the web browser. When re-start of execution of that is instructed (S213 "Yes"), the application execution control part 122 refers to the simple bookmark registration list 131 assigned to and stored in the storage part 13, and judges whether or not the web page displayed by the interrupted application is registered as a simple bookmark (S214). Here, when the bookmark is registered in the simple bookmark registration list 131 (S214 "Yes"), the main control part 120 controls the communication part 11 to connect with the already registered URL and acquire that web page from the site by communication (S216). On the other hand, if the bookmark is a recent (newest information) web page which is not registered in the simple bookmark registration list 131 (S214 "No"), the main control part acquires the content (display history) of that web page from the cache region 132 of the storage part 13 and starts the drawing/display control part 123. The drawing/display control part 123 draws the content of the cache in the display memory 124, reads the content out in synchronization with the display timing of the display part 17, and obtains a desired display (S215).

Next, the specifications (details) of the function switching UI (User Interface) of a mobile phone illustrated as the mobile information terminal will be explained with reference to the screen transition diagrams shown in FIGS. 5 to 8.

First, as shown in the screen transition diagram of FIG. 5, when an application program A (hereinafter, the application program will be simply referred to an "application") is started and execution of the application A is interrupted (state where it is not ended, but used parameters are held), the interruption icon of the application A is displayed on the standby screen. Next, when an application B is started and execution of the application B is interrupted, an interruption icon of the application B is additionally displayed on the standby screen.

Specifically, it is possible to use the standby screen (a) or (d) to start the application A or application B and thereby shift to the start screen (b) or (e) of the application A or application B and then depress the end key and go through a confirmation screen (c) or (f) of the end of the application A or application B to interrupt execution of the application A or application B. At this time, the standby screen (d) or (g) displays the interrupted application A or application B as an interruption icon. Then, if moving the cursor over the interruption icon displayed on the standby screen, the name of that application is displayed. If the icon is selected and clicked on, the execution of the selected interrupted application can be re-started from the interrupted scene.

On the other hand, if the application B (for example a mailer) is started in a state where the application A (browser) is interrupted, the application B start screen (e) is displayed. Here, if a URL is described in mail displayed by the application B, this URL is selected by the user, and communication and connection with this URL are instructed and determined, linkage with the browser application A occurs.

However, the application A (browser application) has been already interrupted, so the application A cannot be newly started based on the linkage. Accordingly, the application A must be once ended, therefore a screen (h) for confirming permission of ending of the interrupted application A is displayed. When permission of ending is instructed by the user, the interrupted application A is once ended, then the application A is newly displayed based on the linkage from the mail (i).

After that, when both of the application B and the application A started linked with the application B are ended and the standby screen is returned to, the processing is already being ended for the application A which was previously interrupted before the linkage, therefore, an icon of interruption is not displayed. Accordingly, the user can not confirm that the application A which had been started before starting the application B had existed. That is, when the duration of execution of the application B or the application A started linked with the application B is long, existence of the application which was previously interrupted sometimes ends up being forgotten, so it is hard to say that the operation state of the application can be understood by the user.

Namely, this means that it is possible to interrupt execution of a plurality of other applications and possible to preserve an operation state, but the browser cannot preserve several operation states. This is because a CPU mounted in the mobile phone or other small-sized device cannot execute multi-tasking due to restrictions on performance.

As opposed to this, below, an improved function switching UI will be explained next. Namely, according to the improved function switching UI, as shown in FIG. 6 showing a screen transition diagram thereof, in a case where there is an interrupted web application and another web page is linked to by another application, the interrupted web page is automatically registered as a simple bookmark whereby even if interrupting a later started web application, the standby screen displays interruption icons of the two web applications.

Specifically, first, the standby screen (a) is used to start the web application A whereby the start screen (b) of the web application A is shifted to and the screen of the application A is displayed. After that, the end key is depressed and the end confirmation screen (c) of the web application A is gone through to interrupt execution of the web application A. At this time, the standby screen (d) displays an interruption icon of the interrupted web application A. Next, when using the application start screen (e) to open mail and the web application B had been linked with this mail, if selecting that URL, the URL of the web page which had been displayed by the web application A is stored, then the web application A is ended and the web application B is newly started (f). After that, if the end key is depressed to perform an operation for ending the web application B, the end confirmation screen (g) displays a confirmation message "end interrupted application A?" Here, where interruption is selected, the interruption standby screen (h) additionally displays the interruption icon of not only the previously interrupted web application A, but also the web application B.

Then, when the cursor is moved over the interruption icon of the interrupted web application A, the name based on the stored URL or page name or the name of that application is displayed. If this icon is selected, the stored URL is utilized to acquire the page again and the web application A is started (i). Namely, execution of that application can be re-started from the interrupted scene. After that, if an operation for ending the application is performed, even if going through the end confirmation screen (j) of the web application A to end the application and returning to the standby screen (k), since the web application B has not ended, its interruption icon continues to be displayed as it is.

Namely, the improved function switching UI described above enables simple re-start of an interrupted web page by holding the URL of the displayed page and its page name etc. by the procedure of registration as a simple bookmark. The simple bookmark registration is a function similar to the standard "favorites" of browsers, therefore, when the URL is specified, then the start of the browser is instructed, the operation at the time of re-start becomes one accompanied with a URL connection, so the function switching UI utilizes this function. Accordingly, the situation where, irrespective of being in the state where another web page has not been started, the interrupted web page cannot be viewed immediately can be avoided. It is preferred to automatically register an interrupted web page as a simple bookmark when another application links to another web page. Alternatively, the user may be made to select this by the settings.

In this way, according to the improved function switching UI described above, when there is an interrupted web application and when another application links to another web page, the interrupted web page is registered as a simple bookmark. When interrupting the later started web application, it becomes possible to display two web application icons on the standby screen. For this reason, it is possible to interrupt a plurality of web applications, it is possible to understand the operation of the application being started, and the web application desired to be re-started can be selected directly from the standby screen. On the other hand, as the applications which the user would like to understand the interrupted operation, other than a browser, there are mail, music player, navigation, and numerous other applications. Accordingly, depending on the method of usage, display of many interruption icons could be possible. However, the standby screen of the mobile phone is relatively small in display region, the situation is that, in the sense of avoiding confusion, it is not desirable to display too many icons.

Accordingly, here, in order to keep from overly increasing the number of interruption icons of the web browser, the function switching UI is further improved. It is configured so as to judge, when interrupting the browser, whether or not interruption information (URL, page name, etc.) concerning the web page being displayed has already been registered as a simple bookmark, and so as not to newly register it and not to generate an interruption icon either when it has been registered.

Figure 7:
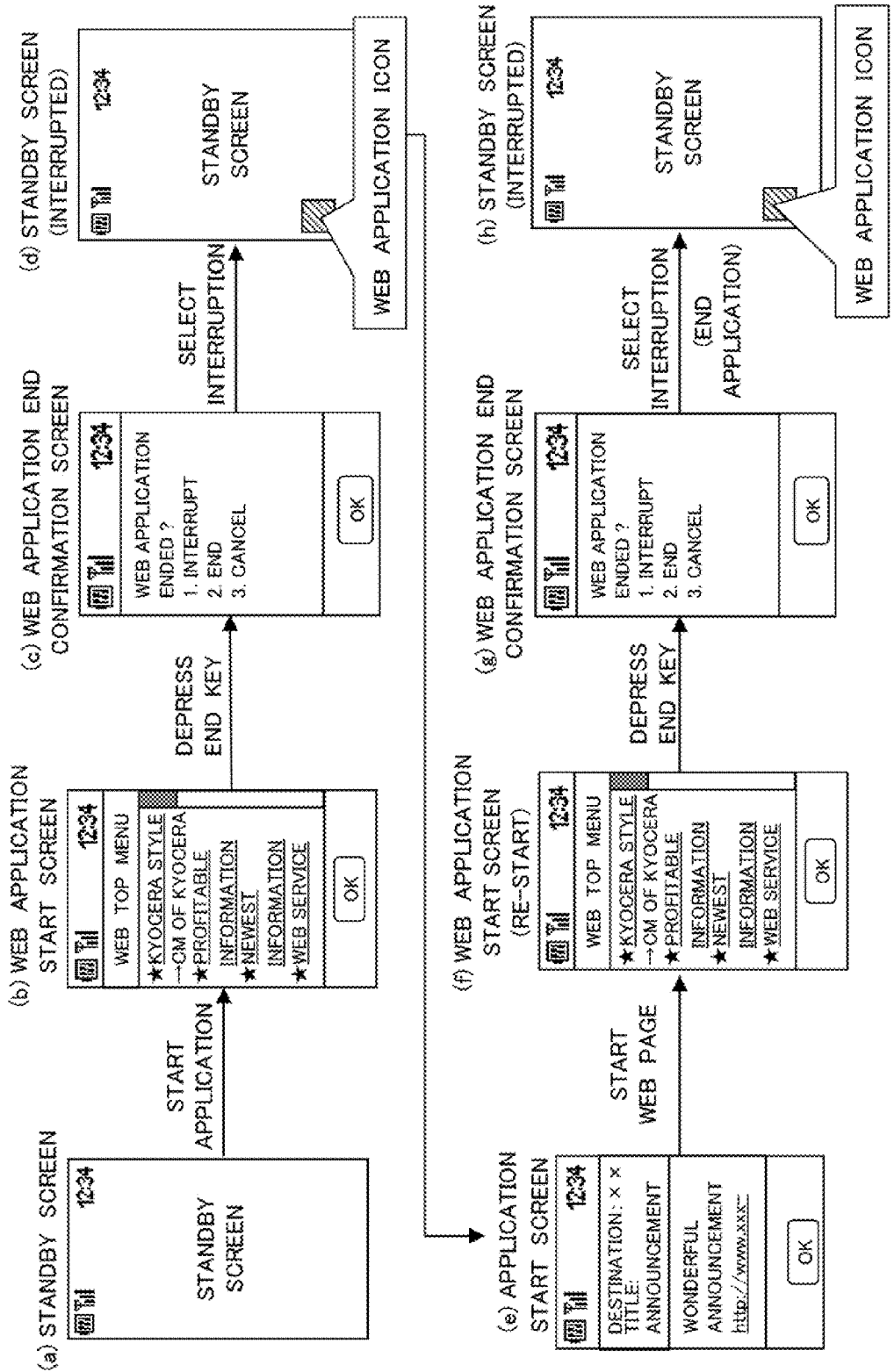
FIG. 7 is a screen transition diagram exemplified for explaining the specifications of a function switching UI in a case where an interrupted web page is the same as the web page which had been already interrupted.

Specifically, an example of the screen transition in a case where a web page being interrupted is the same as an already interrupted web page is shown in FIG. 7. Namely, assume that there is an interrupted web page and that the standby screen (d) displays it as an interruption icon. Assume that in this state, another application links to a web page. If that the web page linked to is the same as the interrupted web page, the interrupted web page is re-started, but when interrupting that the web page, the interruption icon of that the web page is not generated. Accordingly, on the standby screen (h), the number of interruption icons does not increase.

FIG. 8 shows an example of the screen transition by the further improved function switching UI as described above. Namely, when going to interrupt a web page, if an already interrupted web page is the same as the web page going to be interrupted, only the update time information is updated and no interruption icon is displayed.

Specifically, first, the standby screen (a) is used to start the web application A whereby the start screen (b) of the web application A is shifted. The end key is then depressed and the end confirmation screen (c) of the web application A is gone through to interrupt execution of the web application A. At this time, the standby screen (d) displays the interruption icon of the interrupted web application A. Next, if the application start screen (e) is used to open mail and the mail is linked with the web application B (that is, the text of the mail etc. is linked to a URL etc.), if selecting that URL, the start screen (f) of the web application B is shifted to. Then, by depressing the end key, the end confirmation screen (g) of the web application B displays a confirmation message "end interrupted application B?" Here, when interruption is selected, the interruption standby screen (h) additionally displays the interruption icon of, other than the previously interrupted web application A, the web application B.

Next, the interruption icon B displayed on the standby screen (h) is selected and the start screen (i) of an application 2 is shifted to. Here, by selecting a download menu, the start screen of an application C is shifted to linked with a web page C (j), (k). Then, the end key is depressed on the start screen of the web application C and an end confirmation screen (1) is displayed. If selecting interruption, a standby screen (m) is restored. At this time, however, the only interruption icons are for the web applications A and B. The interruption icon of C is not displayed. Accordingly, the interruption icons do not increase.

Namely, since the web page C is the same as the web page A, interruption information is not newly generated. The interruption icon is displayed for only the web page A. Internal processing is added for this. Note that, at this time, only the update time information is updated. The update time information will be explained later, but, for example, is used for management of the order of arrangement of the interruption icons etc.

As explained above, according to the mobile information terminal of the embodiment of the present invention described above, for example, when an interrupted web page is called up by a mailer, if that web page is running in the background, this running web page is registered as a simple bookmark and an interruption icon is generated and displayed on the standby screen. By doing this, even with a relatively cheap CPU having not that high a processing capability, it can be made to appear to the user that a plurality of browsers (tasks) are operating. Due to this, it is possible to realize pseudo-multi-tasking.

Further, when going to interrupt a web page, if an already interrupted web page is the same web page as the web page going to be interrupted, at the time of the interruption, the interruption information is just updated, so this is not newly displayed as an interruption icon. Accordingly, the user can obtain a grasp of the state of the application being started without making the standby screen of a mobile phone or other mobile information terminal having a relatively small effective display screen unnecessarily display interruption icons.

Note that, a browser is provided with a standard function of registering the URLs of displayed pages as simple bookmarks as "favorites". The present invention utilizes this simple bookmark registration function. For this reason, when ending a web application, it is necessary to enable selection as to whether to end the application or register the application as a simple bookmark and interrupt the application. The "simple bookmark registration" referred to here is a function similar to the "favorites" of a browser, therefore, the function is an operation accompanied with the URL connection at the time of re-start. Irrespective of being in a state where no other web page is opened, the interrupted screen cannot be immediately viewed, so when displaying another web page from another application, it is also possible to automatically register the interrupted web page as a simple bookmark. Alternatively, it is possible to provide an environment displaying a setting screen and prompting the user to select the option.

Further, the simple bookmark registration utilized in the present invention, unlike the regular "favorites" registration, is used only at the time of interruption and the content registered as a simple bookmark is discarded at the time of re-start by selection of an interruption icon. Note that, here, a plurality of interruption icons of the same browser are displayed on the standby screen, therefore the application name displayed when moving the cursor to an icon is made the name of the interrupted web page. When the web page does not have a registered name, the URL may be displayed as well.

Note that, according to the embodiment of the present invention described above, the mobile phone 10 was illustrated as the mobile information terminal. However, the invention is not limited to the mobile phone 10 and can be applied to a PDA (personal digital assistant), game machine, etc. in the same way. Further, the functions of the constituent blocks of the information viewing apparatus of the present invention may all be realized by software or at least a portion may be realized by hardware. For example, the processing in the control part 12 (the main control part 120 and application execution control part 122) and the data processing in the communication part 11 and the audio processing part 14 may be realized in a computer by one or more programs. Further, at least a portion may be realized by hardware as well.

Next, a second embodiment of the configuration and operation of a mobile information terminal according to an embodiment of the present invention explained above will be explained.

The mobile phone serving as the mobile information terminal in the present second embodiment has a similar configuration to that of the mobile phone 10 of the embodiment explained above, but differs in part of the configuration. Below, that part of the configuration will be explained.

The control part 12 has the function of controlling the storage of the display history of a document to be displayed on the display part 17 in the storage part 13, each time updating the document, the storage of acquisition destination information concerning the displayed document in the storage part 13 separately from the display history when interrupting execution of the document display application, the display on the display part 17 interrupted display information showing that display of a document by an interrupted document display application is interrupted, and, when the interrupted display information is selected and re-start is instructed, the acquisition of the document again by the communication part 11 based on the acquisition destination information and display it on the display part 17.

Specifically, the control part 12 controls, when interrupting execution of a web application and displaying a new document on the display part, to register the old document as a simple bookmark as the interruption information, end execution of the browser once, re-connect with web, and to display the new document. Note that, the control part 12 displays on the display part a plurality of information showing that there are interrupted documents.

The control part 12 further has the function of controlling the storage of the display history of a document in the storage part 13 each time updating the document to be displayed on the display part 17 and, when the document display application is interrupted in the state displaying a first document and it is requested to display a second document by the document display application during execution of another application, the storage of the acquisition destination information of the first document in the storage part 13 separately from the display history, then making the display part display the second document by the document display application.

Specifically, when the control part 12 displays the web page B on the display part 17, then returns to the standby screen, and displays an icon showing that there is an interrupted web page A. Further, when interrupting display of the web page B and returning to the standby screen, the control part displays icons showing that there the interrupted web page A and web page B at the icon display part 17. Further, when called up from the mailer as another application and the browser is interrupted in the background, the control part 12 registers the running web page B as a simple bookmark and generates an icon showing that the web page B is being interrupted. Further, when re-starting the interrupted web page, it re-connects with the web based on the corresponding interruption information which was registered as a simple bookmark. Further, when re-starting the interrupted web page, so long as the closest web page, it uses the interruption information stored in the cache to display the corresponding web page.

The main control part 120 functions as the control center for realizing the function of the control part 12 of controlling the system so as to store the display history of a document in the storage part 13 each time updating a document to be displayed on the display part 17, store acquisition destination information concerning a document being displayed in the storage part 13 separately from the display history when interrupting execution of a document display application, display on the display part 17 interrupted display information showing that display of a document by the interrupted document display application is being interrupted. Further, when the interrupted display information is selected and re-start is instructed, the main control part acquire the document again by the communication part 11 based on the acquisition destination information and display the document on the display part 17. Here, the main control part administers the sequence control of the blocks explained later.

The main control part 120 further functions as the control center for realizing the function of the control part 12 of controlling the system so as to store the display history of a document in the storage part 13 each time updating a document to be displayed on the display part 17 and, when a document display application is interrupted in a state displaying a first document and display of a second document by the document display application is requested during execution of another application, store acquisition destination information of the first document in the storage part 13 separately from the display history, and then, display the second document by the document display application. Here, the main control part administers the sequence control of the blocks explained later.

Figure 9:
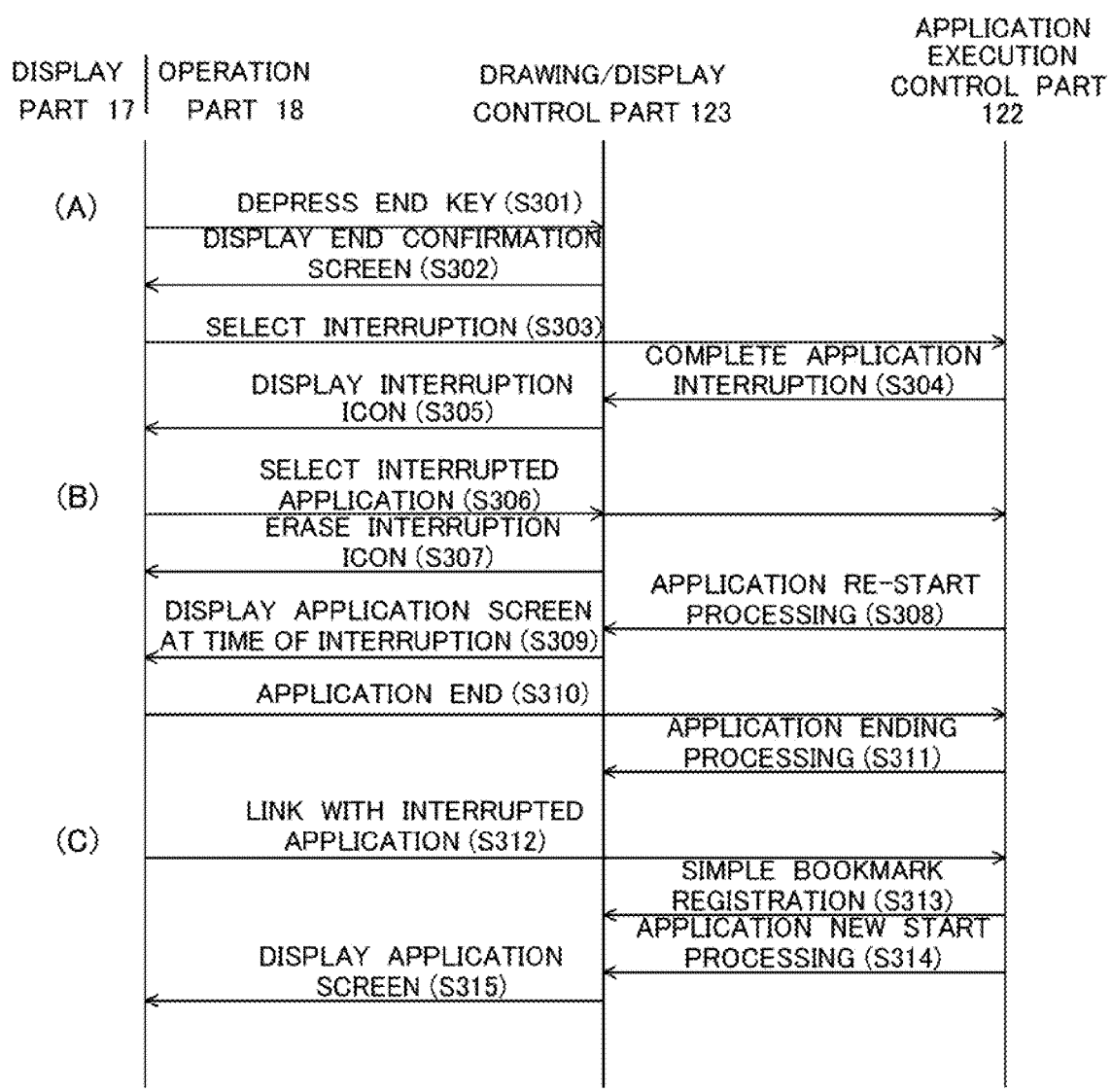
FIG. 9 is an operation sequence diagram exemplified for explaining the operation of a mobile information terminal according to a second embodiment of the present invention.

FIG. 9 is an operation sequence diagram exemplified for explaining the operation of a mobile information terminal according to an embodiment of the present invention. Here, each of (a) the operation at the time of normal ending of an application, (b) the operation at the time of normal re-start of an application, and (c) the registration operation of a simple bookmark at the time of the linkage with an interrupted application among a user interface (display part 17 and operation part 18), drawing/display control part 123, and the application execution control part 122 is shown.

In the operation sequence diagram of FIG. 9, the explanation will be given from the (a) operation sequence at the time of normal ending of an application. Here, when a user operates the operation part 18 and depresses the end key (S301) in a state where a certain application is started, the drawing/display control part 123 generates information displaying an end confirmation screen, draws it in the display memory 124, and displays the end confirmation screen on the display part 17 (S302). On the other hand, when the user confirming the display content selects interruption of the application through the end confirmation screen (S303), the application execution control part 122 executes processing for completion of interruption of the application (S304). Then, upon receiving the notification of the end of the interruption completion processing from the application execution control part 122, the drawing/display control part 123 generates an interruption icon showing existence of an interrupted application, draws the icon in the display memory 124, and displays that interruption icon on the display part 17 (S305).

Next, an explanation will be given of the (b) operation at the time of normal re-start of the application. The user operates the operation part 18 to select the interruption icon displayed at the display part 17 and clicks on the interrupted application (S306). At this time, the drawing/display control part 123 erases that interruption icon (S307). Then, the application execution control part 122 acquires the interruption information of the corresponding application from the storage part 13 and executes the application re-start processing (S308), while the drawing/display control part 123 displays the application screen at the time of the interruption (S309). Then, when the user operates the operation part 18 to instruct the end of the application (S310), the application execution control part 122 executes the processing for ending the application (S311), while the drawing/display control part 123 generates a standby screen information not accompanied with interruption icons and displays the information at the display part 17. Note that, at step S311, it is judged in accordance with the designated interrupted application whether it used a simple bookmark the interruption information and performs the processing in accordance with each.

Next, an explanation will be given of the (c) operation at the time of linkage with the interrupted application. For example, when, in the state where the application A is interrupted, the user operates the operation part 18 to open the application B, and the operation of calling up the interrupted application A is performed from the application B (S312), the application execution control part 122 registers the application A which was in the interrupted state as a simple bookmark (S313) and further ends the processing one time, further newly executes processing for new start of the application A based on the content described in the linked application B, and shifts the control to the drawing/display control part 123 (S314). Due to this, the drawing/display control part 123 generates the application execution screen information and displays the information at the display part 17 (S315).

Figure 10:
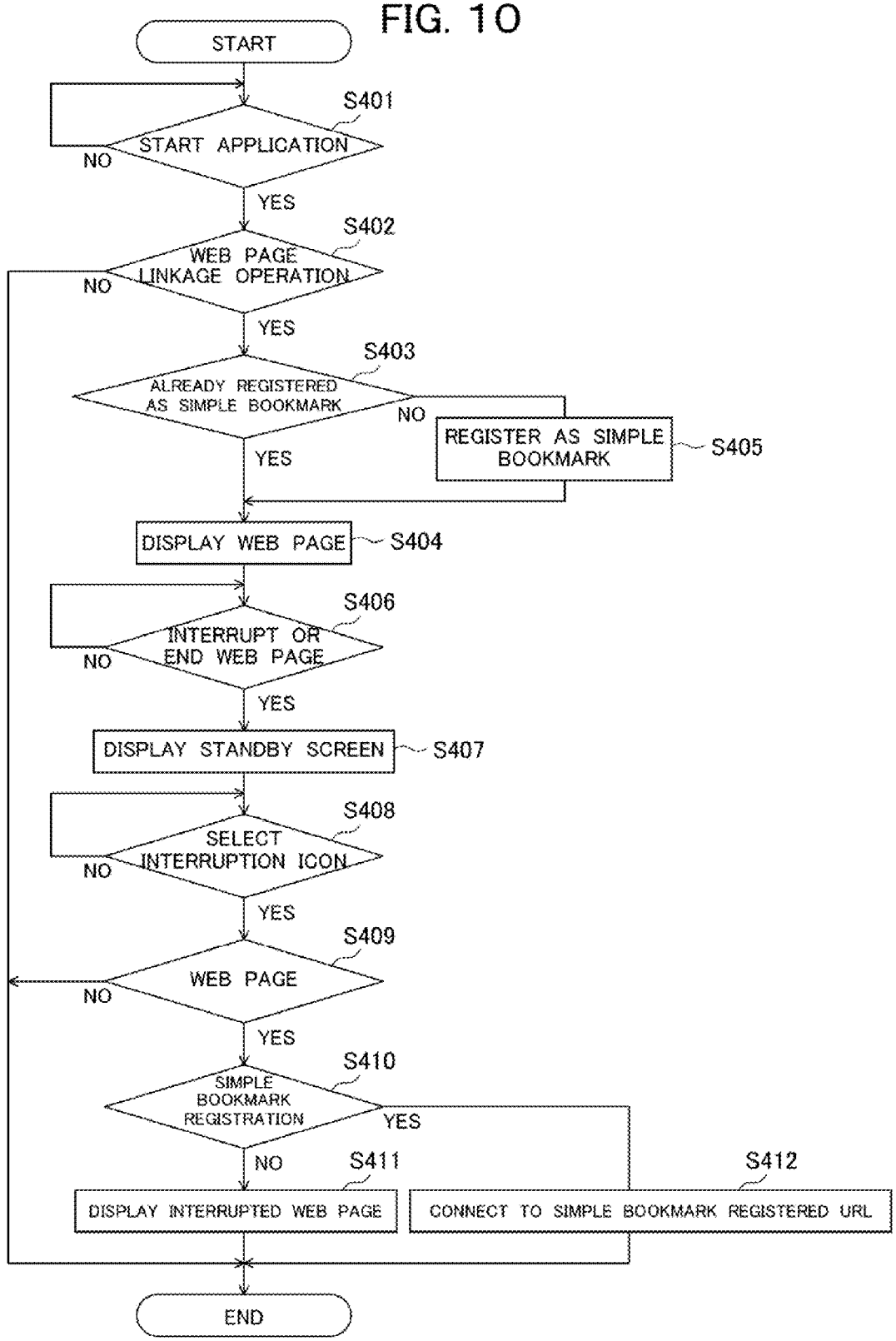
FIG. 10 is a flow chart exemplified for explaining the operation of the mobile information terminal according to the second embodiment of the present invention.

FIG. 10 is a flow chart exemplified for explaining the operation of the mobile information terminal according to the second embodiment of the present invention and shows the flow of the processing at the time of the interruption of an application. Below, the operation of the mobile information terminal according to the second embodiment of the present invention will be explained in detail with reference to the flow chart of FIG. 10.

First, assume that a user starts a certain application (here, mailer) in the state where the processing by the browser is interrupted (S401 "Yes"). Assume the application started here is linked with a web page (specifically, for example, the opened mail is linked with a URL). For example, when the user operates the operation part 18 to select the URL portion in the E-mail (S402 "Yes"), the main control part 120 transfers the URL acquired through the operation input acquisition part 121 to the main control part 120. The main control part 120 starts the application execution control part 122 based on the acquired URL, and the application execution control part 122 refers to the simple bookmark registration list 131 of the storage part 13 based on that URL and judges whether or not the display document of the interrupted browser is registered (S403).

Here, when it is judged that the interrupted web page is registered in the simple bookmark registration list 131 (S403 "Yes"), the application execution control part 122 starts the drawing/display control part 123 and makes the display part 17 display the web page for which start is requested by linkage with the drawing/display control part 123 (S404). While when it is judged that this web page is not registered (S403 "No"), the application execution control part 122 registers the interrupted web page in the simple bookmark registration list 131 of the storage part 13 (S405), starts the drawing/display control part 123, and makes the display part 17 display the web page for which start is requested by linkage (S404).

Then, execution of the linked web page is interrupted again or ended (S406 "Yes"), the standby screen is restored once (S407), then the user selects one of the plurality of interruption icons displayed on the standby screen of the display part 17 (S408 "Yes"). Here, as the interruption icons, other than the browser, for example, there may be a navigation, mailer, music player, and other various types of applications. Further, a plurality of browsers are sometimes included. For this reason, when the cursor is moved over the interruption icon, the name of the interrupted application indicated by the icon is displayed. Further, even during interruption of the browser, text or the URL concerning the web page is displayed from the simple bookmark registration list 131 or cache region 132. This is to make it more convenient for the user at the time of selection.

When the selected interruption icon indicates a web page and re-start of execution of that is instructed (S409 "Yes"), the application execution control part 122 refers to the simple bookmark registration list 131 assigned to and stored in the storage part 13 and judges whether or not that interrupted web page is registered as a simple bookmark (S410).

Here, when the web page is registered (S410 "Yes"), the main control part 120 controls the communication part 11 to connect with the already registered URL and acquire that web page from the site by communication (S412). On the other hand, when the web page is the newest (closest) web page not registered in the simple bookmark registration list 131 (S410 "No"), the main control part acquires the content of that web page (display history) from the cache region of the storage part 13 and starts the drawing/display control part 123. The drawing/display control part 123 draws the content of the cache region 132 in the display memory 124, reads the content out in synchronization with the display timing of the display part 17, and thereby obtains the desired display (S411).

As explained above, according to the mobile information terminal of the embodiment of the present invention described above, for example, when the interrupted web page is called up from the mailer, if that web page is running in the background, this running web page is registered as a simple bookmark, generated as the interruption icon, and displayed on the standby screen, whereby even with a relatively cheap CPU having not that high a processing capability, it can be made to appear to the user that a plurality of browsers (tasks) are operating. Due to this, it is possible to realize pseudo-multi-tasking. Further, by displaying a plurality of interruption icons, the understanding of the execution state of applications becomes easy.

Next, a third embodiment of the configuration and operation of a mobile information terminal according to the embodiment of the present invention explained above will be explained.

The mobile phone serving as the mobile information terminal in the present third embodiment has a similar configuration to that of the mobile phone 10 of the embodiment explained above, but differs in part of the configuration. Below, that part of the configuration will be explained.

The control part 12 has the function of storing the display history of a document in the storage part 13 each time updating the document to be displayed on the display part 17, storing acquisition destination information of a document which had been displayed by an interrupted document display application in the storage part 13 and then starting the document display application based on an event when an event requiring start of the document display application newly occurs during interruption of the document display application, and starting the document display application based on an event while holding the display history of the document which had been displayed by the running document display application in the storage part 13 when an event not requiring start of the document display application newly occurs during interruption of the document display application.

Specifically, when re-start is instructed based on an interruption icon, when the interrupted web page for which re-start is instructed is one which was registered as a simple bookmark (processing of storing the URL for acquiring a web page or that web page), the control part 12 acquires the corresponding web page by communication at the communication part 11 and re-displays it on the display part 17, while when the web page is not registered, re-display it without communication by using the newest information of the cache of the storage part 13. At this time, the control part 12 may also control the system so as to display text etc. based on the interruption information as explained before together with the interruption icon on the standby screen displayed by the display part 17.

Figure 11:
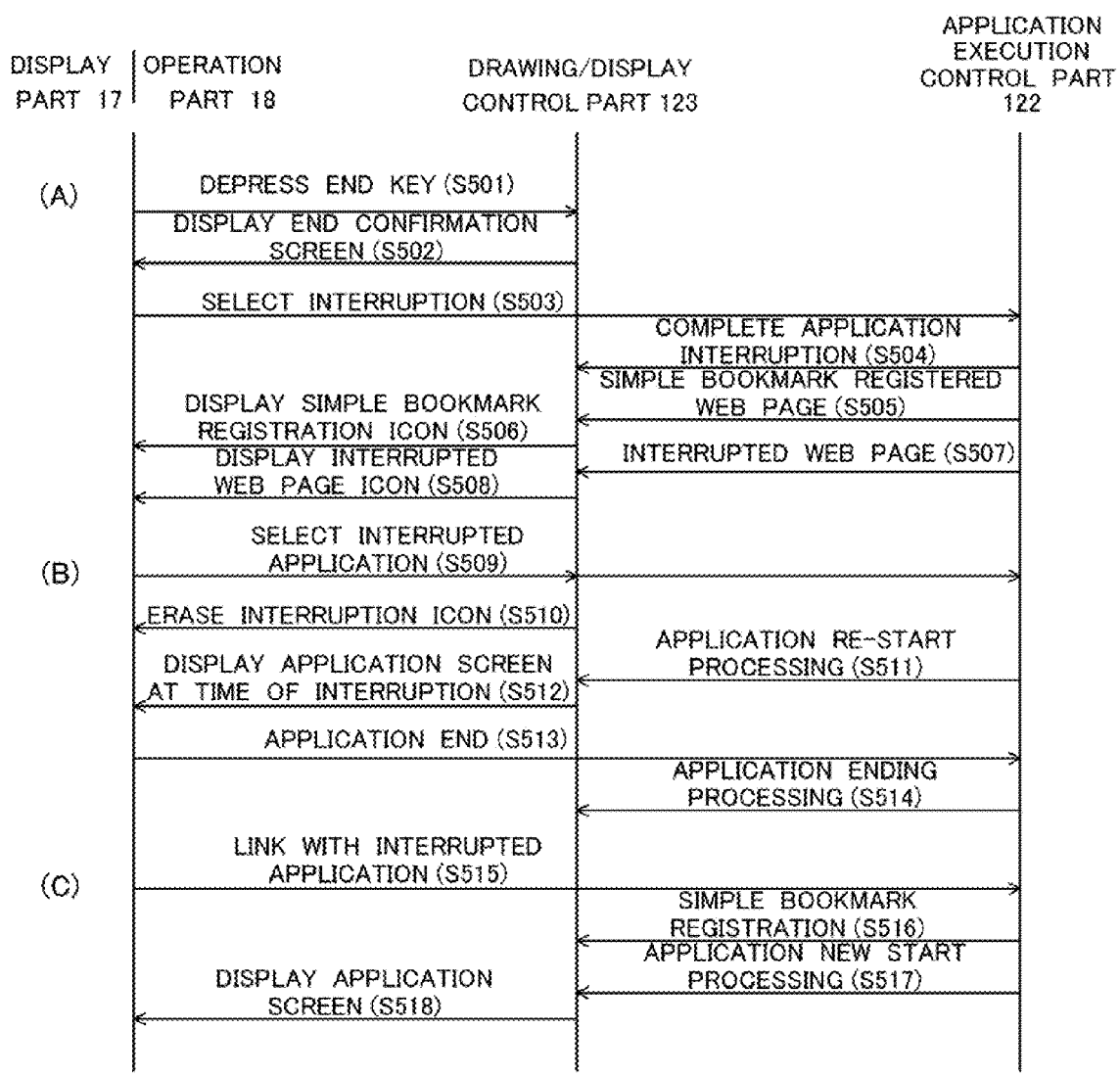
FIG. 11 is an operation sequence diagram exemplified for explaining the operation of a mobile information terminal according to a third embodiment of the present invention.

FIG. 11 is an operation sequence diagram exemplified for explaining the operation of the mobile information terminal according to the third embodiment of the present invention. Here, each of (a) the operation at the time of normal ending of an application, (b) the operation at the time of normal re-start of an application, and (c) the registration operation of a simple bookmark at the time of the linkage with an interrupted application among a user interface (display part 17 and operation part 18), the drawing/display control part 123, and the application execution control part 122 is shown.

In the operation sequence diagram of FIG. 11, an explanation will be given from the (a) operation sequence at the time of normal ending of an application. Here, when the user operates the operation part 18 and depresses the end key (S501) in a state where a certain application is started, the drawing/display control part 123 generates information displaying an end confirmation screen, draws the information in the display memory 124, and displays the end confirmation screen on the display part 17 (S502). On the other hand, when the user confirming the display content selects interruption of the application through the end confirmation screen (S503), the application execution control part 122 judges whether or not there is the same web page in the interrupted application in order to execute processing for completion of interruption of the application, updates the information of the interrupted web page if there is an interrupted web page, and completes the interruption processing of the application (S504). At this time, the application execution control part 122 refers to the simple bookmark registration list 131 of the storage part 13, judges whether or not the web page going to be interrupted is registered, displays the interruption icon based on the simple bookmark registered interruption information in the case where the web page is registered (S505), and displays an interruption icon based on the interruption information of the cache in the case where the web page is not registered (S507) by different display forms (S506, S508).

Next, an explanation will be given of the (b) operation at the time of normal re-start of an application. The user operates the operation part 18 to select the interruption icon displayed on the display part 17 and to click on the interrupted application (S509). At this time, the drawing/display control part 123 erases that interruption icon (S510). Then, the application execution control part 122 acquires the interruption information of the corresponding application from the storage part 13, and executes the application re-start processing (S511), while the drawing/display control part 123 displays the application screen at the time of the interruption (S512). Then, when the user operates the operation part 18 to instruct the end of the application (S513), the application execution control part 122 executes the application ending processing (S514). Due to this, the drawing/display control part 123 generates standby screen information not accompanied with an interruption icon and displays the information on the display part 17. Note that, at step S511, it is judged in accordance with the designated interrupted application, whether the simple bookmark was used as the interruption information, and the processing in accordance with each is executed.

Next, an explanation will be given of the (c) operation at the time of the linkage with an interrupted application. For example, in the state where the application A is interrupted, when the user operates the operation part 18 to open the application B, and an operation of calling up the interrupted application A is made from the application B (S515), the application execution control part 122 registers the application A as a simple bookmark in the interrupted state (S516), further ends the processing one time, further newly executes a new start processing of the application A based on the content described in the linking application B, and shifts the control to the drawing/display control part 123 (S517). Due to this, the drawing/display control part 123 generates the application execution screen information and displays it on the display part 17 (S518).

Figure 12:
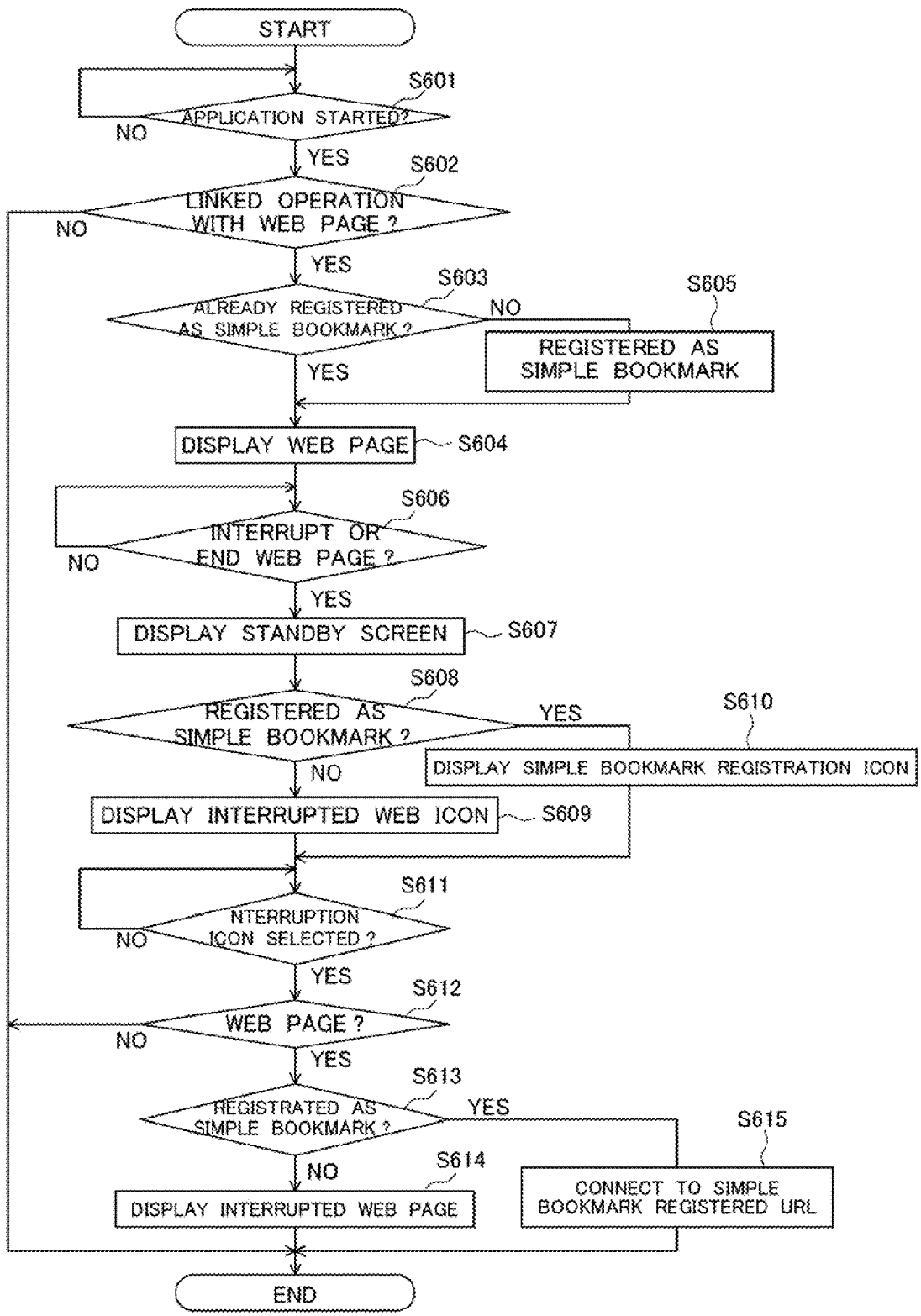
FIG. 12 is a flow chart exemplified for explaining the operation of the mobile information terminal according to the third embodiment of the present invention.

FIG. 12 is a flow chart exemplified for explaining the operation of the mobile information terminal according to the third embodiment of the present invention and shows the flow of the processing at the time of the interruption of an application. Below, the operation of the mobile information terminal according to the third embodiment of the present invention will be explained in detail with reference to the flow chart of FIG. 12.

First, assume that the user starts a certain application (here, a mailer) in the state where the processing by the browser is interrupted (S601 "Yes"). Assume the application started here is linked with a web page (specifically, for example, the opened mail is linked to a URL). For example, when the user operates the operation part 18 to select the URL portion in the e-mail (S602 "Yes"), the main control part 120 transfers the URL acquired through the operation input acquisition part 121 to the main control part 120. The main control part 120 starts the application execution control part 122 based on the acquired URL, while the application execution control part 122 refers to the simple bookmark registration list 131 of the storage part 13 based on that URL and judges whether or not the linked interrupted browser is registered (S603).

Here, when it is judged that the interrupted web page is registered in the simple bookmark registration list 131 (S603 "Yes"), the application execution control part 122 starts the drawing/display control part 123 and makes the display part 17 display the web page for which the start is requested by linkage with the drawing/display control part 123 (S604). While when it is judged that this web page is not registered (S603 "No"), the application execution control part 122 registers the interrupted web page in the simple bookmark registration list 131 of the storage part 13 (S605), starts the drawing/display control part 123, and makes the display part 17 display the web page for which start is requested by linkage (S604).

On the other hand, when the user confirming the display content selects interruption or ending of the application through the end confirmation screen (S606 "Yes"), the application execution control part 122 judges whether or not there is same web page in the interrupted application so as to execute the interruption completion processing of the application, updates the information of the interrupted web page if there is an interrupted web page, completes the interruption processing of the application, and returns to the standby screen (S607).

At this time, the application execution control part 122 refers to the simple bookmark registration list 131 of the storage part 13 and judges whether or not the web page going to be interrupted is registered (S608), emphatically displays the interruption icon based on the simple bookmark registered interruption information by coloring etc. (S609) when the web page has been registered (S608 "Yes"), and displays the interruption icon based on the interruption information of the cache (S610) in the case of no registration (S608 "No") in different display forms.

Next, the user selects one of the plurality of interruption icons displayed on the standby screen of the display part 17 (S611 "Yes"). Here, as the interruption icons, other than the browser, for example, there are a navigation, mailer, music player, and other various types of applications. Further, a plurality of browsers are sometimes included. For this reason, when generating an interruption icon, the application name included in the system information is linked with it. When the cursor is moved over the interruption icon, the name of the interrupted application indicated by the icon is displayed. Further, even during interruption of the browser, the text or URL concerning the web page is displayed from the simple bookmark registration list 131 or cache region 132. This is to make it more convenient for the user at the time of selection.

When the selected interruption icon indicates a web page and re-start of execution of that is instructed (S612 "Yes"), the application execution control part 122 refers to the simple bookmark registration list 131 assigned to and stored in the storage part 13 and judges whether or not that interrupted web page is registered as a simple bookmark (S613).

Here, when the web page is registered as a simple bookmark (S613 "Yes"), the main control part 120 controls the communication part 11 to connect to the already registered URL and acquire that web page from the site by communication (S615). On the other hand, if the web page is the closest (newest information) web page which is not registered as a "favorite" in the simple bookmark registration list 131 (S613 "No"), the main control part 120 acquires the content (display history) of that web page from the cache region 132 of the storage part 13, and starts the drawing/display control part 123. The drawing/display control part 123 draws the content of the cache region 132 in the display memory 124, reads the content out in synchronization with the display timing of the display part 17, and thereby obtains the desired display (S614).

Figure 13:
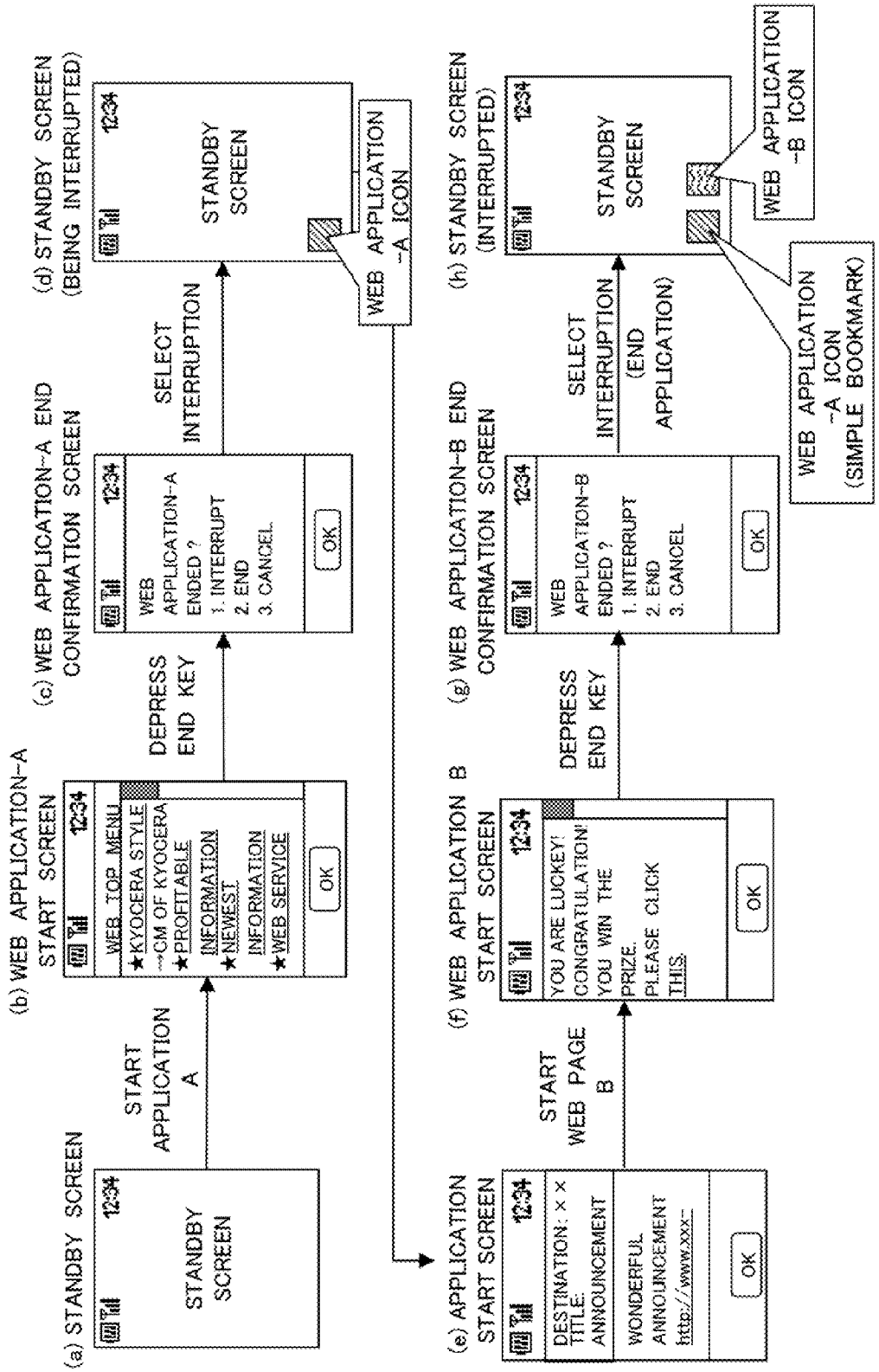
FIG. 13 is a screen transition diagram exemplified for explaining the specifications of the function switching UI of the mobile information terminal according to the third embodiment of the present invention.

Below, the specifications (details) of the function switching UI (user interface) of the mobile phone illustrated as the mobile information terminal will be simply explained with reference to the screen transition diagrams shown in FIG. 13 and FIG. 14.

First, as applications which the user desires to understand the operations for, other than the web browser, there are many applications such as mail, a music player, and navigation. Accordingly, according to the method of usage, display of many interruption icons is anticipated. For a user to with the understanding of the states of execution of activated applications, if displaying an interruption icon by a display form differentiated from those of the others according to an operation state of the application, further improvement of handling is possible. In particular, in the case of a web application, it is sometimes requested to also display whether or not the interruption icon is registered as a simple bookmark. Namely, this is because, there is no problem if the interruption information is registered in the cache at the time of re-start of an interrupted browser, but it is necessary to acquire the interrupted web page by re-connection with the network in the case where it is registered as a simple bookmark and a charge is sometimes incurred. Further, if the mobile phone is out of service area, communication is impossible, and the desired web page cannot be displayed. Accordingly, if this can be differentiated by just viewing the interruption icon, the operation of the application being started can be perfectly grasped.

Further, by extracting the URL or web page name which is held and generating the name of the interrupted web page, by displaying the name together with the interruption icon, it is possible for the user to immediately find the application whose content was confirmed, in particular, a web page displayed by a web browser. Further, when not registering the URL etc. as a simple bookmark, the same applies even when extracting the page name from the cache and showing it together with the interruption icon.

Here, in order to satisfy the above request, the function switching UI described above is further improved. For example, as shown in FIG. 13 showing a screen transition diagram, when an interruption icon displayed on the standby screen (d) is selected, the linked web page is displayed, interruption is selected, and the standby screen (h) is returned to, if that interrupted web page is registered as the simple bookmark, this is displayed in a different display form from that of the usual interruption icon by coloring or emphatic display (indicated by hatching in FIG. 13).

Further, as shown in FIG. 14 showing the screen transition diagram, even when an interrupted web page is displayed by the same display form when it is registered as the simple bookmark as that for the usual interruption icon, it may be displayed accompanied with a speech balloon as shown on the standby screens (i) and (j) appearing when the cursor is moved over it so as to select the interruption icon and re-start the execution. Then, by displaying the name of the web page and other text in a different manner, for example, changing the colors of the speech balloons, or acquiring the web page name or acquiring the content described on the web page from the cache as explained before, the user can more correctly learn the interruption state shown by each interruption icon.

As explained above, according to the mobile information terminal according to the embodiment of the present invention described above, for example, in a case where the interrupted web page is called up from a mailer, if that web page is running in the background, by registered this running web page as the simple bookmark and generating the interruption icon for display on the standby screen, even with a relatively cheap CPU having not that high a processing capability, it can be made to appear to the user that a plurality of browsers (tasks) are operating. Due to this, it is possible to realize pseudo-multi-tasking.

Further, when the interruption icon displayed on the standby screen is selected, if the interrupted web page is registered as the simple bookmark, by coloring or emphatically displaying that interruption icon to display it in a display form different from those of the other usual interruption icons, the user can be made to pay attention to the fact that communication will be involved if this interruption icon is selected. Note that, the interruption icon may be differentiated from others by having a speech balloon appear when the cursor is moved to the interruption icon, by changing the color of the speech balloon, or by displaying the web page or other text in the speech balloon.

The invention claimed is:

1. A mobile information terminal comprising:
a display part for displaying a document;
a storage part for storing information;
a communication part which can be connected to a network; and
a control part for controlling execution of application programs including a document display application program for displaying a document acquired by the communication part, wherein, the control part
judges whether or not acquisition destination information concerning the document being displayed is stored in the storage part, when interrupting execution of the document display application program, wherein the acquisition destination information comprises information concerning a network location of the document,
makes the storage part store the acquisition destination information if the information was not previously stored, or prevents the storage part from storing the acquisition destination information in the storage part if the information was previously stored, and
stores a document display history in the storage part, each time a document to be displayed on the display part is updated, and makes the storage part store the acquisition destination information separately from the document display history when the acquisition destination information is not stored in the storage part.

2. A mobile information terminal as set forth in claim 1, wherein the control part updates an update time of the document display stored together with the acquisition destination information in the storage part when the acquisition destination information has been already stored in the storage part.

3. A mobile information terminal as set forth in claim 1, wherein the control part makes the display part display interrupted display information showing that the display of the document by the document display application program is being interrupted, when the document display application program is interrupted.

4. A mobile information terminal as set forth in claim 3, wherein the control part, when making the display part display a standby screen, makes the display part display the interrupted display information together, while makes the display part display the information in an order based on corresponding updating times when there are a plurality of interrupted display information to be displayed.

5. A mobile information terminal as set forth in claim 3, wherein the control part makes the communication part acquire the document based on the acquisition destination information corresponding to the selected interrupted display information so as to re-display the document according to the document display application program, when the interrupted display information displayed on the display part is selected.

6. A mobile information terminal as set forth in claim 5, wherein the control part
stores the document display history in the storage part, each time the document to be displayed on the display part is updated, and
re-displays the document according to the document display application program based on the document display history when there is no acquisition destination information corresponding to the selected interrupted display information.

7. A mobile information terminal as set forth in claim 1, wherein the control part
makes the storage part store the acquisition destination information concerning a first document being displayed when another application program starts during execution of the document display application program, and
interrupts the other application program and judges whether or not the acquisition destination information of the second document is stored in the storage part, when the acquisition destination information of a second document is linked with a portion of the information handled by the other application program and linked acquisition of the second document is instructed.

8. A mobile information terminal comprising:
a display part for displaying a document;
a storage part for storing information;
a communication part which can be connected to a network; and a control part controlling execution of application programs including a document display application program for displaying a document acquired by the communication part, wherein the control part makes the storage part store acquisition destination information of the document which had been displayed by the interrupted document display application program, when an event occurs requiring the new start of the document display application program during interruption of the document display application program, then starts the document display application program based on the event, wherein the acquisition destination information comprises information concerning a network location of the document, starts the document display application program based on the event while holding a document display history which had been displayed by the document display application program which had been executed in the storage part, when an event occurs not requiring the new start of the document display application program during interruption of the document display application program acquires the document by the communication part by using the acquisition destination information, when re-start is instructed based on the interrupted display information, and displays the document on the display part in the case where the interrupted document for which re-start is instructed is one having the acquisition destination information, and displays the document on the display part based on the display history stored in the storage part each time the display of the document to be displayed on the display part is updated in the case where the interrupted document for which re-start is instructed is not one having the acquisition destination information.

9. A mobile information terminal as set forth in claim 8, wherein the control part displays the interrupted display information showing that there is an interrupted document display application program when making the display part display the standby screen in a state where the document display application program is interrupted.

10. A mobile information terminal as set forth in claim 8, wherein the control part extracts information concerning the document corresponding to the interrupted display information based on the acquisition destination information or the display history, when displaying the interrupted display information on the display part.

* * * * *